United States Patent
Dilmaghanian et al.

(10) Patent No.: US 10,520,092 B2
(45) Date of Patent: Dec. 31, 2019

(54) SEAL ASSEMBLIES FOR EXTREME TEMPERATURES AND RELATED METHODS

(71) Applicant: Bal Seal Engineering, Inc., Foothill Ranch, CA (US)

(72) Inventors: Farshid Dilmaghanian, Rancho Santa Margarita, CA (US); Marc Soriano, Irvine, CA (US); Peter J. Balsells, Newport Beach, CA (US); Shirley Zhou, Hong Kong (HK); Majid Ghasiri, Mission Viejo, CA (US); Derek Changsrivong, Costa Mesa, CA (US); Raul Magana, Moreno Valley, CA (US)

(73) Assignee: Bal Seal Engineering, Inc., Foothill Ranch, CA (US)

( * ) Notice: Subject to any disclaimer, the term of this patent is extended or adjusted under 35 U.S.C. 154(b) by 0 days.

(21) Appl. No.: 15/792,267

(22) Filed: Oct. 24, 2017

(65) Prior Publication Data
US 2018/0112778 A1    Apr. 26, 2018

Related U.S. Application Data

(60) Provisional application No. 62/412,135, filed on Oct. 24, 2016.

(51) Int. Cl.
*F16J 15/3208* (2016.01)
*F16J 15/3212* (2016.01)
(Continued)

(52) U.S. Cl.
CPC ......... *F16J 15/3212* (2013.01); *F16J 15/164* (2013.01); *F16J 15/328* (2013.01); *F16J 15/3236* (2013.01); *F16J 15/3284* (2013.01)

(58) Field of Classification Search
CPC .... F16J 15/3212; F16J 15/164; F16J 15/3236; F16J 15/328; F16J 15/3284
See application file for complete search history.

(56) References Cited

U.S. PATENT DOCUMENTS 4,428,587 A * 1/1984 Forch ............... F16J 15/008
277/424
4,655,945 A 4/1987 Balsells
(Continued)

FOREIGN PATENT DOCUMENTS

BE    1014549 A3 * 12/2003 ............. F16J 15/164
CN    104595493 A    5/2015
(Continued)

OTHER PUBLICATIONS

Extended European Search Report from European Patent Office (EPO) on co-pending EP application (EP17198160.8) dated Mar. 21, 2018.

*Primary Examiner* — Gilbert Y Lee
(74) *Attorney, Agent, or Firm* — Klein, O'Neill & Singh, LLP

(57) ABSTRACT

Seal assembly designs for extreme temperatures that include material and structural designs to counteract sealing component shrinkage or expansion caused by thermal expansion or contraction. Provisions can be included to increase sealing stress along the outer seal lip of the seal assembly for low temperature applications where shrinkage can be an issue and to increase sealing stress along the inner seal lip of the seal assembly for high temperature applications where expansion can be an issue.

13 Claims, 8 Drawing Sheets

(51) Int. Cl.
*F16J 15/16* (2006.01)
*F16J 15/3236* (2016.01)
*F16J 15/328* (2016.01)
*F16J 15/3284* (2016.01)

(56) References Cited

U.S. PATENT DOCUMENTS

| | | |
|---|---|---|
| 4,804,290 A | 2/1989 | Balsells |
| 4,805,943 A | 2/1989 | Balsells |
| 4,890,937 A * | 1/1990 | Balsells ............... F16C 27/02 277/589 |
| 4,907,788 A | 3/1990 | Balsells |
| 5,072,070 A | 12/1991 | Balsells |
| 5,079,388 A | 1/1992 | Balsells |
| 5,091,606 A | 2/1992 | Balsells |
| 5,117,066 A | 5/1992 | Balsells |
| 5,134,244 A | 7/1992 | Balsells |
| 5,161,806 A | 11/1992 | Balsells |
| 5,265,890 A | 11/1993 | Balsells |
| 5,358,224 A | 10/1994 | Balsells |
| 5,474,309 A | 12/1995 | Balsells |
| 5,575,487 A | 11/1996 | Balsells |
| 5,599,027 A | 2/1997 | Balsells |
| 5,979,904 A | 11/1999 | Balsells |
| 5,984,316 A | 11/1999 | Balsells |
| 5,992,856 A | 11/1999 | Balsells et al. |
| 6,050,572 A | 4/2000 | Balsells et al. |
| 6,161,838 A | 12/2000 | Balsells |
| 6,264,205 B1 | 7/2001 | Balsells |
| 6,641,141 B2 | 11/2003 | Schroeder |
| 7,210,398 B2 | 5/2007 | Balsells |
| 7,464,750 B2 | 12/2008 | Schapel et al. |
| 8,056,902 B2 * | 11/2011 | Roddis ............... F16J 15/164 277/347 |
| 8,096,559 B2 | 1/2012 | Cook |
| 8,328,202 B2 | 12/2012 | Foster et al. |
| 8,544,850 B2 | 10/2013 | Balsells et al. |
| 8,684,362 B2 | 4/2014 | Balsells et al. |
| 9,194,497 B2 | 11/2015 | Rastegar |
| 9,234,591 B2 | 1/2016 | Dilmaghanian et al. |
| 9,285,034 B2 | 3/2016 | Balsells et al. |
| 9,357,684 B2 | 5/2016 | Foster |
| 10,117,366 B2 * | 10/2018 | Dilmaghanian ..... H05K 9/0016 |
| 2002/0153664 A1 * | 10/2002 | Schroeder ............. F16J 15/002 277/551 |
| 2010/0219585 A1 * | 9/2010 | Roddis ............... F16J 15/164 277/347 |
| 2010/0237565 A1 | 9/2010 | Foster |
| 2010/0237566 A1 * | 9/2010 | Balsells ............... F16J 15/166 277/550 |
| 2011/0006486 A1 | 1/2011 | Niknezhad |
| 2013/0043661 A1 | 2/2013 | Binder et al. |
| 2014/0265139 A1 * | 9/2014 | Dilmaghanian ..... F16J 15/3208 277/309 |
| 2014/0312570 A1 | 10/2014 | Foster |
| 2016/0047473 A1 | 2/2016 | Foster et al. |
| 2016/0223086 A1 | 8/2016 | Balsells et al. |
| 2017/0172018 A1 | 6/2017 | Dilmaghanian et al. |
| 2017/0261108 A1 | 9/2017 | Soler et al. |
| 2017/0328474 A1 | 11/2017 | Balsells |
| 2018/0119857 A1 * | 5/2018 | Balsells ............... F16F 1/045 |

FOREIGN PATENT DOCUMENTS

EP          0922891 A2    6/1999
JP         2015 102132 A  6/2015

* cited by examiner

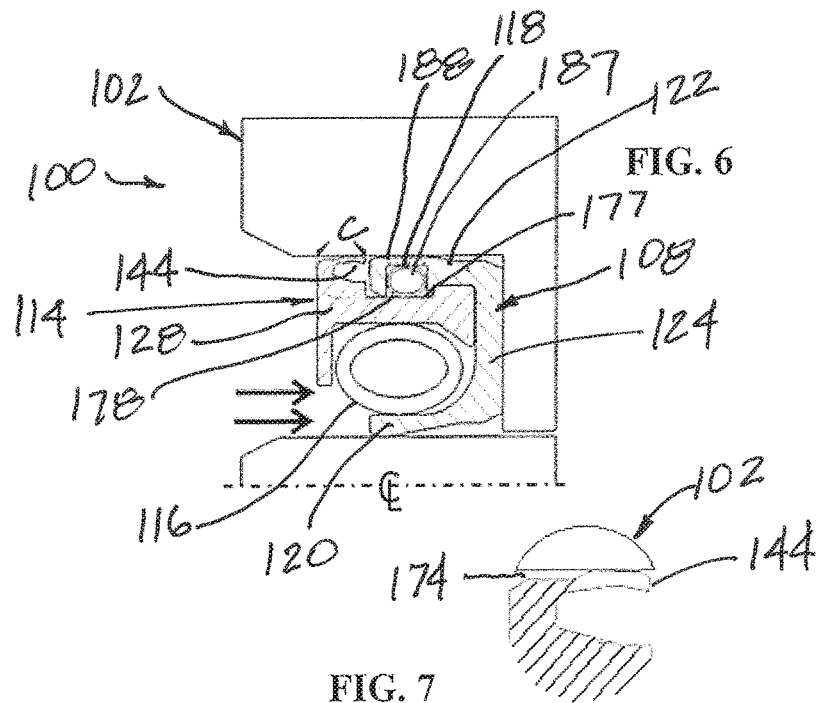
FIG. 6
FIG. 7
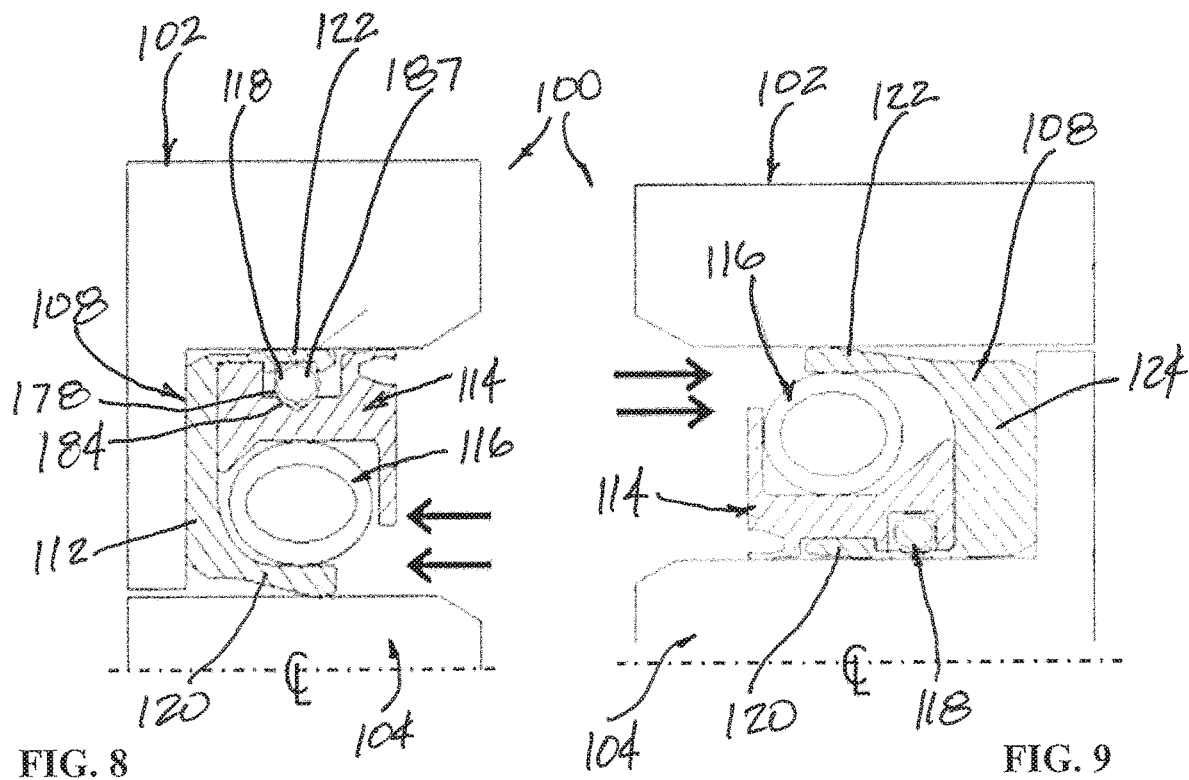
FIG. 8
FIG. 9

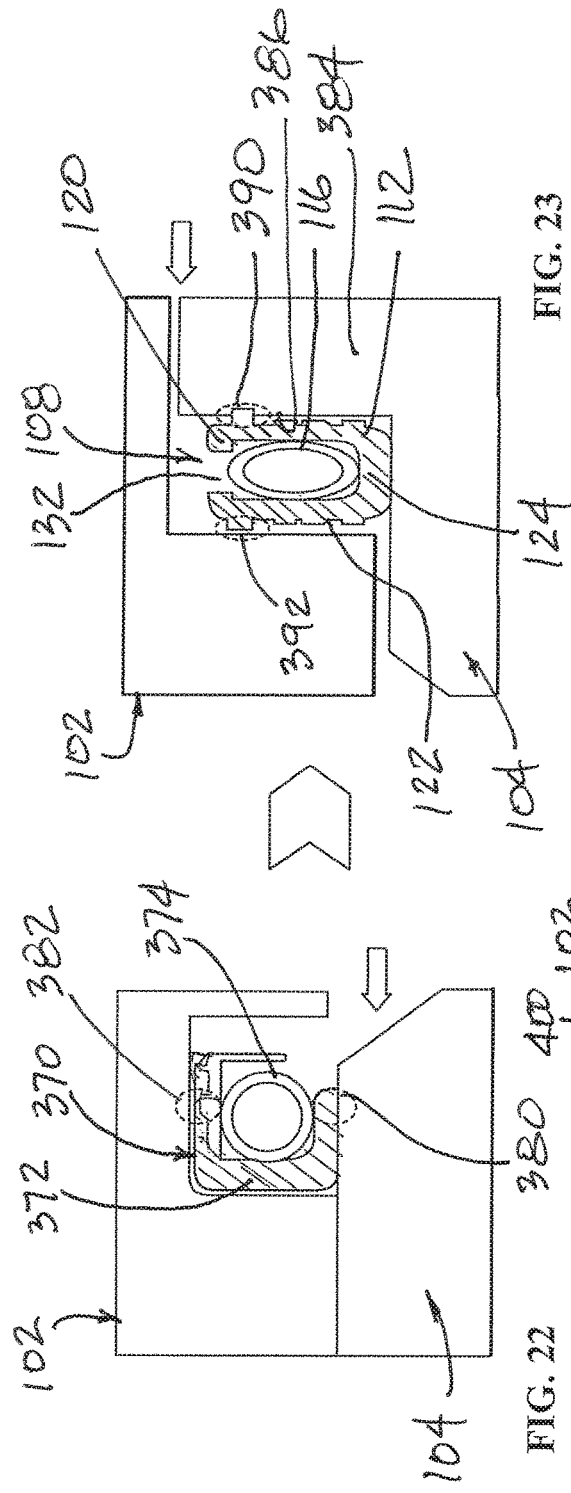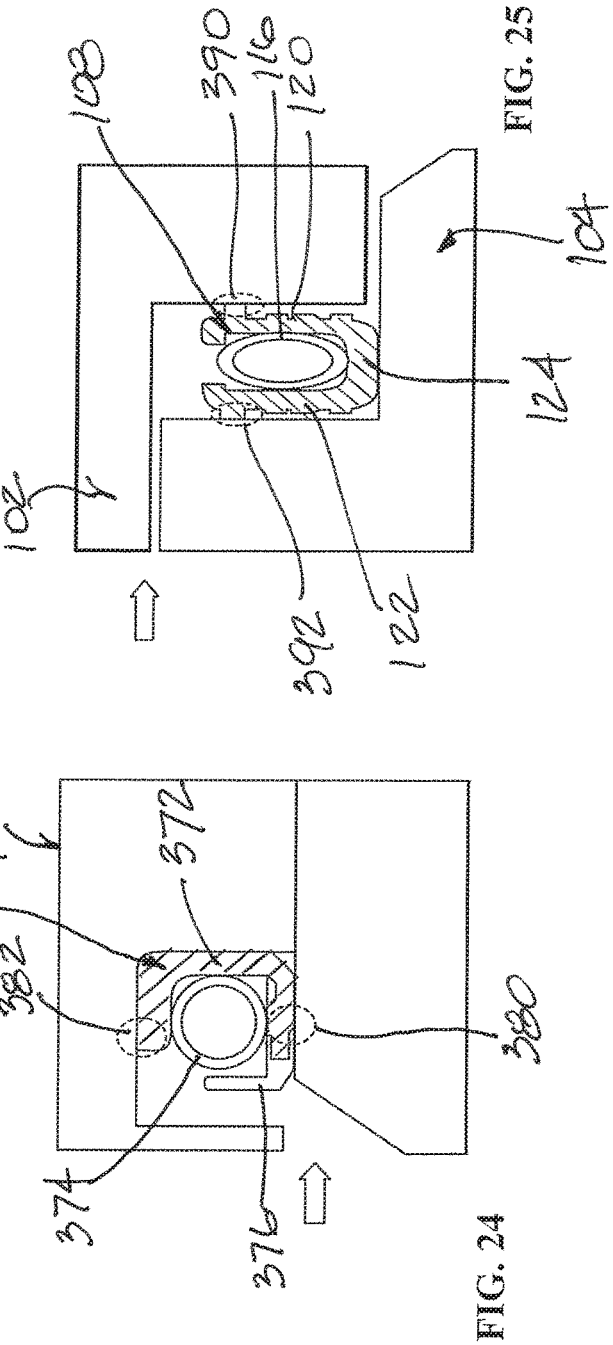

SEAL ASSEMBLIES FOR EXTREME TEMPERATURES AND RELATED METHODS

The present invention generally relates to seal assemblies and more particularly to seal assemblies configured for extreme temperature applications, including for low temperature applications and high temperature applications.

BACKGROUND

Conventional seal assembly designs, or simply called seals, may experience thermal contraction or expansion under extreme temperatures, such as shrinkage or contraction towards the inside diameter (ID) in a cryogenic temperature application or expansion towards the outside diameter (OD) in an elevated heat temperature application. Such thermal contraction or expansion experienced by these prior art seal designs can result in the loss of sealing contact at the OD or the ID and, thus, the sealing ability on the outer seal lip or the inner seal lip of the sealing element, respectively.

In cryogenic sealing applications, plastic materials can shrink about ten (10) times more than metallic materials. These differences in shrink rates could pose a dilemma in common sealing cases where conventional seals are typically made of plastic in the sealing contact area and the shaft and bore are generally made out of metal.

SUMMARY

Seal designs in accordance with aspects of the present invention can be used in extreme temperature applications, which can be understood to refer to temperatures at elevated heat or reduced cryogenic levels.

The seal assembly designs presented herein can provide advantages over conventional seal designs in applications with extreme temperatures whereby thermal contraction or expansion causes sealing component material to shrink (in cryogenic temperatures) or expand (in elevated heat temperatures).

Aspects of the present invention include seal designs that provide resolutions to the issue of seal shrinkage, using designs and materials that give support to reduce seal shrinkage in extreme temperature scenarios. Seal designs for such applications can include one or more of the following properties and advantages over conventional seal designs: (i) the addition of a rigid component that provides additional sealing support to the sealing component; (ii) the use of more than one spring energizer within a seal assembly's configuration to provide additional sealing on the seal OD upon seal shrinkage toward the ID; (iii) the inclusion of a housing or shaft comprising a shelf in which such a configuration takes advantage of shrinkage or expansion rather than trying to prevent such phenomena; (iv) the configuration of a seal assembly with an axial sealing component comprising a flange that provides additional sealing support to the axial sealing component during extreme temperatures; (v) all of the features; or (vi) combinations of the features.

Aspects of the present invention further comprise a method of using a spring energized lip seal at extreme temperatures. The method can comprise the steps: placing a seal assembly in a housing to seal against a surface, wherein the seal assembly comprises: a seal element comprising an inside flange, an outside flange, and a center channel section, which together define a seal cavity, said center channel section comprising a channel defining a receiving space; a locking ring comprising a first section and a second section extending from the first section, said second section having a tip extending into the receiving space of the channel; a first loading spring biasing against a first surface of the second section and against the inside flange; a second loading spring biasing against a second surface of the second section and against the outside flange; securing the seal assembly against rotation relative to the housing or the surface.

The method wherein the first section of the locking ring can comprise a leaf spring or a contact edge. The method can include the step of engaging the leaf spring with the housing or engaging the contact edge with the housing.

The method can further comprise biasing the inside flange and the outside flange away from one another.

The method can further comprise engaging a step on the second section with a step located in the receiving space of the channel.

The method wherein the first surface can comprise a groove and wherein the first loading spring can be positioned in the groove.

The method wherein the first loading spring can be a combination spring comprising a ribbon spring comprising a plurality of coils and a canted coil spring located within the plurality of coils of the ribbon spring.

The method wherein the inside flange or the outside flange can comprise a groove and wherein the first loading spring or the second loading spring can contact the groove.

The method can further comprise placing a first support ring in contact with an inner interior surface of the inside flange and placing a second support ring in contact with an outer interior surface of the outside flange.

Aspects of the present embodiment further include a spring assembly for extreme temperature applications comprising: a seal element comprising an inside flange, an outside flange, and a center channel section, which together define a seal cavity, said center channel section comprising a channel defining a receiving space; a locking ring comprising a first section and a second section extending from the first section, said second section having a tip extending into the receiving space of the channel; a first loading spring biasing against a first surface of the second section and against the inside flange; a second loading spring biasing against a second surface of the second section and against the outside flange.

The spring assembly can further comprise a leaf spring or a contact edge at an end of the first section.

The second section of the locking ring can comprise a step or lip engaging a step or lip located in the receiving space of the channel of the center channel section.

The spring assembly can further comprise a groove formed with an outer interior surface of the outside flange.

The spring assembly can further comprise placing a first support ring in contact with an inner interior surface of the inside flange and placing a second support ring in contact with an outer interior surface of the outside flange.

The first surface can comprise a groove and wherein the first loading spring is positioned in the groove.

A still further aspect of the present invention includes a spring assembly for extreme temperature applications comprising: a seal element comprising an inside flange, an outside flange, and a center channel section, which together define a seal cavity, said center channel section comprising a channel defining a receiving space; a locking ring engaging the outside flange; said locking ring comprising a body comprising a groove; a first loading spring biasing against the locking ring and the inside flange; a second loading spring located in the groove of the locking ring and biasing against a bottom surface of the groove of the locking ring and an inside surface of the outside flange.

The spring assembly can further comprise a center channel extension formed with the seal element projecting into a reduced spaced defined by a shelf of a housing.

A seal assembly for extreme temperature applications can comprise: a singularly formed seal body comprising a primary seal having a primary seal inside flange and a secondary seal having a secondary seal inside flange; a first loading spring biasing the inside flange of the primary seal against a shaft; a second loading spring biasing the inside flange of the secondary seal against a surface of a shelf formed with a housing.

A further aspect of the present invention includes a method of mounting a seal assembly for extreme temperature applications comprising: placing a seal assembly in a space between a housing having a bore and a shaft located in the bore of the housing, said shaft comprising a shaft axis and said seal assembly comprising a seal element comprising a first sealing flange, a second sealing flange, and a center channel section, which together define a seal cavity; positioning the seal element such that the first sealing flange and the second flange are both generally orthogonal to the shaft axis; and locating a loading spring in the seal cavity to bias the first sealing flange and the second sealing flange away from one another.

Seal assemblies of the present application can operate in a sealing environment. The sealing environment can include a gland or housing and a shaft or pin.

A seal assembly can be located between the housing or gland and the shaft for providing a seal between the gland and the shaft. In some examples, the surface to be sealed can be other than a shaft, such a plate or a flange. The shaft can be solid throughout or can have a hollow bore for fluid flow through the center thereof.

The various components of the seal assembly are understood as being round in configuration with only a part or section thereof shown in the various figures. The sealing environment with the gland and shaft can represent any number of devices or assemblies, such as a valve, a pump, a piston or actuator, a compressor, a reciprocating device, a gear box, etc.

The shaft can rotate, can reciprocate, or both rotate and reciprocate relative to the gland. In the present embodiment, the seal assembly can include a seal element and one or more spring energizers, which can be a canted coil spring, a ribbon spring, or a combination canted coil spring and ribbon spring, one inside the other, as further discussed below.

Optionally, a locking ring can be included with the seal assembly. Locking rings described herein can engage a structure, such as a gland, with a leaf spring or a butt-end or terminal end, which can be rounded or blunt, in an interference fit.

Optionally, a secondary seal can be included to enable an inside seal lip of the secondary seal to seal potential fluid leak from the outside seal lip of the primary seal for low temperature applications. For high temperature applications, the same arrange but wherein inner and outer seal lips are swapped due to expansion of the various components rather than shrinkage of the various components.

In an example, a seal assembly can include a seal element, a locking ring, a seal loading spring, which can be called a primary or first loading spring, and a secondary or second loading spring. Some seal assemblies can use only a single loading spring while others can use more than two loading springs.

A seal element of a seal assembly of the present invention can comprise an inside flange, an outside flange, and a center channel section, which together define a seal cavity for accommodating a loading spring.

The terms inside and outside, as used herein, are relative to one another and to the shaft, such as to the centerline of the shaft. The terms first and second, upper and lower, and primary and secondary are to designate two different elements by name only, which are not necessarily structurally different unless the context indicates otherwise.

The inside flange of a seal element can have an inner exterior surface defining a sealing lip for sealing against the surface of a shaft and an inner interior surface that contacts a loading spring. The outside flange has a sealing lip for sealing against the surface of the gland. The outside flange has an outer exterior surface defining a sealing lip for sealing against the surface of the gland and an outer interior surface that contacts the locking ring and the second loading spring, as further discussed below.

The locking ring can comprise a body, such as a locking ring body, having a shaped inner surface that together with the inside flange of the seal element define a contour of a primary spring cavity, seal assembly cavity, or a seal cavity to accommodate the primary loading spring. The loading spring can be any number of loading springs described herein.

The cavity can be called a spring cavity since it is sized and shaped to receive a spring. The cavity can also be called a seal cavity since the cavity is defined by the sealing element. The primary loading spring, or simply any loading spring, can be in a spring ring configuration, where the spring's two ends are connected into a ring shape, and biased against the inner inside flange of the seal element as well as the shaped inner surface of the locking ring.

The shaped inner surface of the locking ring can have a tapered section closest to the center channel section of the seal element and a flat section having a surface that is generally parallel to the surface of the shaft, when installed onto a shaft. The location of the tapered section can help to control the axial location or position of the primary loading spring within the spring cavity, such as by contacting and biasing the primary spring towards the radial lip of the locking ring.

In an example, the primary loading spring is in contact with the inside flange, the shaped inner surface and a radial lip of a locking ring. The length of the radial lip can vary and the radial lip can be an optional feature and when incorporated, reduces the size of the entry opening to the spring cavity to inhibit dislodgment of the primary spring from the spring cavity. An insert edge opposite the radial lip can be configured to contact the center channel section of the seal element.

The locking ring can have an extending lip or finger defining a leaf spring formed by incorporating a notch into the body of the locking ring. The leaf spring can have a free end that points in the direction away from the seal element. In other examples, the notch can be located elsewhere in the body of the locking ring so that the finger of the leaf spring points in the direction of the seal element. The leaf spring can be located on a contact end of a radial portion of the locking ring. The leaf spring can be located along an outer periphery of the locking ring so as to bias against the gland when installed therein, and not be limited by other parts of the locking ring.

The leaf spring can provide a biasing force between the locking ring and the housing to restrict the seal assembly from rotating relative to the housing, if housing mounted. In some examples, the seal assembly can be shaft mounted and the locking ring is locked to or engaged to the shaft to prevent relative rotation with the shaft. In other examples, a rounded tip on the radial contact end of the locking ring can engage the housing by interference rather than a leaf spring.

The locking ring can be provided with one or more grooves. When more than one groove is incorporated in the body of the locking ring, a first groove can be provided on the locking ring along the outer periphery of the locking ring adjacent the leaf spring. The first groove can be continuous about the central axis of the seal assembly, which can be generally coincident with the axis of the shaft.

The first groove can have a generally three-sided rectangular shape with optional chamfered corners and the first groove can be configured to engage an enlarged lip portion or step on the outside flange of the seal element. The first groove can be larger than the enlarged lip portion of the seal element that engages the first groove. Larger can mean longer or wider to facilitate engagement between the two. The first groove and the step can have abutting edges to restrict axial play.

The engagement between the first groove and the enlarged lip portion can minimize the possibility of separation between the locking ring and the seal element, such as during assembly of the seal assembly or when installing the seal assembly into the gland.

A second groove can be provided with the locking ring along the outer periphery of the locking ring adjacent the first groove. The second groove of the locking ring can have a generally three-sided rectangular or square shape configuration that can be selected or sized to accommodate the second loading spring. The second loading spring can bias against the bottom surface of the second groove and against the outer interior surface of the outside flange to urge the outer exterior surface of the outside flange of the seal element against the surface of the gland to provide a seal therebetween.

Seal assemblies described herein are adapted for low extreme temperature applications by using materials that can be fabricated to a desired size and shape and be supported structurally using one or more biasing springs. Low cryogenic temperatures can range from −459° F. to high temperatures operating at 450° F. or anywhere in between.

In an example, plastic material is selected for the seal element along with using small thicknesses that can provide surface deflection at low temperatures yet have a sufficient spring force to bring the sealing surfaces in contact with the metal surfaces, such as stainless steel surfaces used for the gland and shaft. The selected plastic can remain relatively flexible at the sealing temperature, due in part to the thinness of the plastic material, and along with targeted sealing stress can generate the needed surface contacts for an adequate seal to counteract against shrinkage along the outside sealing flange.

In an example, the plastic material selected for use as the sealing element can fall in the class of fluoropolymers. Other plastics can include ULTEM®, RADEL® R, PEEK and DuPont VESPEL®. The degree of flexibility of the plastic can also depend in part of the thickness of the sealing area and the sealing stress provided on that area to bring the seal in contact with the metal sealing surface. The thickness can be that of the inside flange and/or of the outside flange of the sealing element. The thickness of the sealing flange can be understood as being analogous to the thickness of an object, such as thickness of a piece of paper.

In an example, the sealing area can be provided with a sealing thickness of approximately 0.0004 inch to 0.007 inch. This measurement can also be referred to as the thinness of the sealing flange to enable the sealing flange to still be manipulated by the loading spring even when under extremely low temperatures. The upper range of the thickness can extend a larger value, such as to 0.011 to 0.015 inch. However, the final sealing thickness can depend on a number of factors, including the operating temperature and the selected material.

In general, the lower the temperature, the thinner the material should be to provide the flexibility needed to effect sealing. An exemplary fluoropolymer that can be used is ultra-high molecular weight (UHMW) fluoropolymer. In a particular example, UHMW polyethylene can be selected for the sealing element.

In an example, the primary loading spring, the secondary loading spring, or both the primary and the secondary loading springs can be a canted coil spring, a ribbon spring, one of each, or a combination ribbon spring and canted coil spring. A V-spring can also be used as a loading spring. Canted coil springs and ribbon springs, separately, are well known in the spring industry or field. For example, canted coil springs are disclosed in U.S. Pat. No. 5,139,276, the contents of which are expressly incorporated herein by reference.

Each canted coil spring, which can have a length configuration with two free ends or a ring configuration in which the two ends are connected, comprises a plurality of interconnected coils with each coil pre-canted along the same canting direction and along a selected canting angle. When biased by a force applied tangential to the coil axis, the coils will further cant in the same canting direction. This unique characteristic of canted coil springs cannot be found in standard helical extension springs, which can only expand or contract but not cant along a radial direction to the length.

Helical ribbon springs are readily searchable using the term "ribbon spring" or "helical ribbon spring" using various internet search engines. In the present embodiment, a spring assembly or a loading spring as used herein can comprise a combination ribbon spring and canted coil spring located inside the coils of the ribbon spring. The combination spring assembly with a ribbon spring and a canted coil spring can be used with any of the various seal assemblies described herein. The spring assembly with the two different springs, one inside the other, can have the benefit of providing a large contact area between the individual coils of the ribbon spring and the seal element. This is because a ribbon spring is typically formed using a wider tape-like strip to form the coils of the ribbon spring compared to using a wire to coil a typical canted coil spring.

At extreme temperature conditions, the relatively larger contact areas of the coils of the ribbon spring, which is tape-like versus typical round wires of a canted coil spring, can minimize embedding or sinking of the coils into the surface of the seal element.

The canted coil spring located inside the ribbon spring in a combination spring assembly can have a generally constant force over a range of deflection of the coils and therefore can provide additional force for the overall combination spring assembly and the spring assembly therefore offers more total spring force than a single spring could provide. The canted coil spring may also provide support to the ribbon spring to prevent deformation of the ribbon spring at higher deflection amounts where a ribbon spring alone, such as the coils of the helical ribbon spring, could permanently deform.

The coils of the inner canted coil spring can therefore support the compression or load experienced by the coils of the outer helical ribbon spring. Additionally, because the width of each coil of the helical ribbon spring is relatively wider or larger than the width of each coil of a typical canted coil spring, the ribbon spring may provide a larger surface of contact for loading onto a surface, such as the surface of a seal element, to energize a seal lip in certain cases where a canted coil spring alone could embed or dig into the seal material or create large gaps between where the coils of the canted coil spring contact the seal element.

The combination spring assembly is shown schematically in FIG. 3, which shows a coil of a ribbon spring and a coil of a canted coil spring located within the coil of the ribbon spring. The combination spring assembly can be in a ring configuration with the ends of the ribbon spring and/or the ends of the canted coil spring connected to form a ring shape.

A seal assembly of the present application is configured so that upon assembly, the primary loading spring and the secondary loading spring are loaded to apply appropriate sealing force to affect sealing. The sealing stress applied to the inner and outer sealing flanges can depend on the temperature that the seal assembly is to be used.

For cryogenic temperatures, the sealing stress could be as high as around 5000 psi to press a sealing surface to seal against a metal surface. For high temperature applications, in the order of 300° F. or higher, the sealing stress could be as low as 50 psi, depending on the fluid being sealed and the material of the seal.

In general, the lower the temperatures, the higher is the sealing stress and the smaller is the sealing thickness to affect sealing. For higher temperatures, the lower is the sealing stress required to affect sealing and the sealing thickness can be relatively larger than for providing a good seal at lower temperatures.

A loading spring can be located in a groove of a locking ring. The loading spring can bias against the bottom surface of the groove of the locking ring and against the outer interior surface of the outside flange to apply a load on the outside flange to seal against the gland or housing.

In an example, the outer interior surface of an outside flange of a seal element can have a groove and the loading spring contacts the outside flange at the groove formed with the outside flange. The groove formed with the outside sealing flange can be incorporated to thin-out the section of the outside flange so that the spring can apply an increased stress or load to the outside flange to seal against the gland, which can increase the loading stress on the outside flange in low temperature applications to counteract shrinkage and hardening of the seal material and to maintain a seal against the housing.

Depending on the application temperature, the sealing thickness of the outside flange at the groove is approximately 0.0004 inch to 0.007 inch. The upper range can extend a larger value, such as to 0.011 to 0.015 inch when the temperature is higher and depending on the material selection for the sealing element. Other thickness range is contemplated for higher operating temperatures and for different plastic materials.

A leaf spring incorporated with a locking ring provided herein can bias against a gland or housing. The leaf spring can extend radially outward to ensure contact between the leaf spring and the gland. A gap can be provided adjacent the leaf spring, between the gland and the locking ring.

For low temperature applications, such as in cryogenic operating range, the various components shown, such as components of the seal assembly, the housing, and the shaft will shrink with the sealing element, made of a plastic material, shrinking a greater amount than the gland, the locking ring, the springs, and the shaft, which are typically made from a metal material such as stainless steel. The shrinkage at cryogenic operating range is in the order of about 10 to 1 for plastic to metal. Consequently, a potential leakage path can open up due to the shrinkage rates of the outside flange of the seal element compared to the gland.

The potential leakage path of the seal assembly in the cryogenic application can be minimized by incorporating a relatively thin area on the outside flange, such as in the area of a groove of the outside flange. An appropriately sized stress load can be provided at the thin area of the groove to ensure sufficient biasing force to the outside flange to press the thin area of the outside flange against the housing or gland. In an example, the biasing stress applied to the thin area of the outside flange can be in the order of 3000 psi and higher, up to about 5000 psi or higher.

For high temperature applications, such as in the order of 300° F. or higher. All components will expand. Thus, a potential leakage path can open up along the inside diameter of the seal assembly due to the expansion of the inside flange of the seal element and the shaft. In the present embodiment, the potential leakage path can be minimized by incorporating a spring assembly for the primary loading spring that has a large deflection operating range to bias the inside flange into sealing contact with the shaft despite the material expansion of the sealing element. As described elsewhere herein, the required stress to seal the inside flange of a seal element against the shaft due to expansion at high temperatures is much lower than when sealing the outside flange of the seal element against the housing due to shrinkage at low temperatures.

In an example, a locking ring provided herein can be modified to incorporate a leaf spring having a finger that points in the direction of the center channel section of the sealing element. The locking ring can also incorporate a groove along an outer periphery of the body instead of two separate grooves for the locking ring described elsewhere. The groove of the locking ring can have three sides with one of the sides located near a recess for forming the leaf spring. The side of the groove adjacent the recess can be taller or have a larger in dimension than the opposite side. The groove edge with the shorter dimension can engage a lip or shoulder formed on the outside flange. In the present embodiment, the groove on the locking ring can be sized and shaped to both engage the outside flange of the sealing element and to accommodate a secondary loading spring.

The far tip of the outside flange or the end-most tip of the outside flange can have hook-like terminal end, which can have three sides and an open side to receive the secondary loading spring. The secondary loading spring can be positioned within the three-sided groove of the terminal end of the outside sealing flange and the three-sided groove of the locking ring.

Regarding the three-sided groove of the terminal end, the bottom surface between the two sides present a thin part or section of the outside sealing flange that is thinner than other parts of the outside flange, such as when comparing to the section of the outside flange near the intersection with the center channel section. This relatively thinner part or section can provide the same or similar function as the thin part of the groove.

The groove of the outside flange can be incorporated to thin-out the section of the outside flange so that the spring can apply an increased stress or load to the outside flange to seal the outside flange against the gland, which can be problematic at low cryogenic temperatures. Depending on the operating temperature of the application, the sealing thickness of the outside flange at the groove can be approximately 0.0004 inch to 0.007 inch. The upper range can extend a larger value, such as to 0.011 to 0.015 inch when the temperature is higher. Other thickness range is contemplated for higher operating temperatures.

For seal assemblies and seal assembly components disclosed herein, it is understood that where a feature is shown but not expressly described and is otherwise the same or similar to the feature or features described elsewhere, such as above with reference to FIGS. 1-7, the disclosed part or parts shown in all the drawing figures but not expressly described because of redundancy and because knowledge is built on a foundation laid by earlier disclosures may nonetheless be understood to be described or taught by the same or similar features expressly set forth in the text for the embodiments in which the feature or features are described. Said differently, subsequent disclosures of the present application are built upon the foundation of earlier disclosures unless the context indicates otherwise.

The disclosure is therefore understood to teach a person of ordinary skill in the art the disclosed embodiments and the features of the disclosed embodiments without having to repeat similar components and features in all embodiments since a skilled artisan would not disregard similar structural features having just read about them in several preceding paragraphs nor ignore knowledge gained from earlier descriptions set forth in the same specification. As such, the same or similar features shown in the following seal assemblies incorporate the teachings of earlier embodiments unless the context indicates otherwise. Therefore, it is contemplated that later disclosed embodiments enjoy the benefit of earlier expressly described embodiments, such as features and structures of earlier described embodiments, unless the context indicates otherwise.

A locking ring provided herein can incorporate a leaf spring having a finger that points away from the center channel section of a seal element and wherein the outside flange can incorporate a three-sided groove and the locking ring can incorporate a three-sided groove. A spring can be located within the two grooves, between the locking ring and the outside sealing flange. In an example, a locating groove can be provided at the bottom surface of the groove of the locking ring. The locating groove can help to locate the secondary loading spring therein, to restrict axial movement of the loading spring within the width of the groove. The locating groove within the holding groove can have a V-shape or can have a V-shape with a subtended surface between the two tapered surfaces.

In an example, the seal assembly can be shaft mounted rather than housing mounted. That is, the seal assembly provided herein can be installed onto the shaft with the locking ring of the seal assembly then used to lock to the surface of the shaft to prevent rotation relative to the shaft.

In an example, the outside flange of the seal element, which is outside relative to the inside flange and to the shaft axis, is configured to seal against the surface of the gland. The seal assembly that is shaft mounted can rotate or reciprocate with the shaft and seal against the surface of the gland.

A seal assembly provided in accordance with aspects of the present invention can be located in a gland for sealing against a surface, such as a shaft or a stationary plate or flange. The seal assembly can comprise a seal element, a loading spring, and a pair of support rings, which can each be made from a metal band, or metal ring.

In the present embodiment, an inside support ring in the form of a metal band can be provided on the inner interior surface of the inside flange and in contact therewith.

An outside support ring in the form of a band can be provided on the outer interior surface of the outside flange and in contact therewith. The outside support ring can have a larger diameter than the inside support ring and both support rings can be located within the seal cavity of the seal element. The present seal assembly may be used in any number of sealing environments in extreme temperature applications.

The two support rings can be configured to serve as protective sheaths, layers, or barriers for the inner interior surface of the inside flange and the outer interior surface of the outside flange, respectively.

As the primary loading spring can bear against the inside and outside flanges of the seal element and biases them outwardly away from one another, the biasing force of the individual coils of the loading spring does not embed or bury into the relatively softer material of the sealing element that is now protected by the support rings. The support rings can also support to reduce the seal element shrinkage in low temperature applications, such as −320° F. and below. The support rings can be used with any seal element described elsewhere herein where a loading spring biases the inner and outer sealing flanges of the seal element away from one another.

In an example, one or both support rings can be provided with scurf cuts on the surfaces thereof. A scurf cut generates a rough, scaly or flaky surface that can help to improve gripping and friction between the support rings and the respective sealing flanges of the seal element. The support rings of the present embodiment can be configured to protect or shield the sealing element, such as the outer interior surface of the outside sealing flange and the inner interior surface of the inside sealing flange, from possible embedding or protrusion from the coils of the loading spring.

The loading spring can be a canted coil spring, a ribbon spring, or a combination spring in which the canted coil spring is located within the coils of the ribbon spring, as shown in FIG. 3. Optionally, a V-spring can be used for the loading spring. The seal element described herein can be made from PTFE, UHMW fluoropolymer, or other suitable plastic materials.

A seal assembly provided herein can comprise a seal element, a metal band, and two loading springs. The two loading springs 116, 117 can be of the same type and same size or can be of different types and the same or different size. For example, one loading spring can be a canted coil spring and the other loading spring can be a combination spring or a V-spring.

A seal element provided herein can comprise an inside flange, an outside flange, and a center channel section located between the two flanges. Two loading springs can be provided for biasing the two sealing flanges away from one another, one for biasing the inside flange and one for biasing the outside flange. Support rings, such as those rings shown in FIG. 10, may be used with the seal assembly of the present embodiment or for other embodiments described herein.

A metal band of the present embodiment can comprise a body having two spring grooves. The metal band can be provided for a loading spring to push against to bias one of the sealing flanges.

In an example, the outside flange of a sealing element can have a lip that engages a lip on the metal band to retain the metal band and therefore the two loading springs in place inside the spring cavity of the seal element. The first groove can have three sides and can be generally U-shape along a side cross-section. The first groove can receive one of the loading springs therein to bias against the outer interior surface of the outer flange.

The second groove of the metal band can have an extended radial extending lip forming one of the three sides of the groove. The side opposite the radial extending lip can be tapered for turning, rotating, or urging the coils of the loading spring or can be generally square or rectangular. The second groove can receive the second loading spring to bias the inside flange outwardly against a surface to be sealed.

The inner and outer sealing flanges and the center channel section of a seal element define a seal cavity. By utilizing two loading springs within the same seal cavity and combining the force deflection characteristics of both springs, the overall working range of the two springs can generate a generally constant force over a larger range of deflection than for a single loading spring. Thus, in low temperature applications wherein shrinkage can be an issue, having two loading springs can allow the outer loading spring to load against the outside flange to force the outside flange to seal against the metal surface.

Optionally, a groove having a reduced or thinned out section can be provided on the outside flange of the seal element. This thinned out section can allow a loading spring to load the outside loading flange to generate a high sealing stress to force the outside flange to seal against the metal surface even under low temperature applications.

A housing or gland provided herein can be machined or cut to produce a shelf and to form a reduced or secondary space adjacent a standard spring space inside the housing for accommodating a spring assembly. For example, the housing can be solid or cast with a recess and then further cut or machined to define the secondary space and form the shelf. The shelf can include a shelf surface and a tip or nose section with a chamfered tip. The inner surface of the shelf can define a bore for receiving the shaft.

A seal assembly for use with a housing having a shelf can comprise a seal element having two opposed sets of sealing lips from a primary seal and a secondary seal. The primary seal can comprise a primary inside flange, a primary outside flange, and a center channel section. The secondary seal can comprise a secondary inside flange, a secondary outside flange, and a secondary center channel section. Each sealing flange of the present embodiment can have a tip.

The two tips of the two sealing flanges of the primary seal and the two tips of the two sealing flanges of the secondary seal can point away from one another. The primary seal and the secondary seal can be unitarily or singularly formed from a single material, such as from a same plastic material during a same plastic injection molding. Optionally, two different sets of support rings may be used with the primary and secondary seals of the unitarily formed seal element of the present embodiment. Different parts of the seal element can be joined to form a seal body having both a primary seal and a secondary seal, as further discussed below.

A loading spring can be used with the primary seal and another loading spring can be used with the secondary seal. The two loading springs can be of the same type, of different types, of similar or different sizes. For example, one loading spring can be a canted coil spring and the other loading spring can be a ribbon spring or a combination ribbon spring having a canted coil spring located inside the ribbon spring, as discussed with reference to FIG. 3. The seal assembly with singularly formed primary and secondary seals can have four sealing points, one at each sealing flange. The sealing points can be provided by a primary seal and a secondary seal. The seal assembly with both the primary and secondary seals is well suited for low temperature applications where component shrinkage can be an issue. For example, in very low temperature applications, the seal element can shrink, which can cause the outside flange of the primary seal and the outside flange of the secondary seal to move away from the surfaces of the housing. However, when the seal element shrinks, the two inside flanges of the primary and secondary seals are further pressed against the surface of the shaft and the shelf surface.

If fluid pressure is coming from the area of the primary seal and leaks across the interface at the outside flange of the primary seal and the outside flange of the secondary seal of a dual primary seal and secondary seal embodiment due to material shrinkage, fluid pressure can then be contained by the seal provided by the inner flange of the secondary seal and the shelf surface. Thus, inclusion of the secondary seal for sealing against a shelf can counteract material shrinkage at low operating temperatures.

A seal assembly provided herein can take advantage of shrinkage to improve sealing along the inside flanges of the primary and secondary seals and compensate for potential leaks along the outer flanges of the primary and secondary seals. Thus, every leakage path that can ultimately leak out to the environment must pass through a surface, such as through an inside flange, that is sealed by an energized inside flange of a seal element.

A housing or gland can be provided with a shelf that is arranged away from the shaft for housing a seal assembly having a primary seal and a secondary seal that are singularly formed and radially spaced from one another, relative to the shaft axis. Thus, instead of being axially spaced from one another, the primary and secondary seals are spaced radially from one another. In the present embodiment, the position of the shelf inside the housing creates two distinct cavity spaces or sections for accommodating the primary seal and the secondary seal of the seal assembly.

The shelf in the present embodiment cam be provided with an elongated body that embodies a rod or pin shape in cross-section. The nose tip of the shelf can be chamfered. The seal element can surround the elongated body.

A seal assembly provided herein can comprise a seal element having two opposed sets of sealing lips from a primary seal and a secondary seal.

The primary seal can comprise a primary inside flange, a primary outside flange, and a center channel section.

The secondary seal can comprise a secondary inside flange, a secondary outside flange, and a secondary center channel section. As shown, the primary seal and the secondary seal are unitarily or singularly formed from a single material, such as from a same plastic material.

Optionally, two different sets of support rings, such as those shown in FIG. 10, may be used with the primary and secondary seals of the present embodiment. The primary seal of the present embodiment can have only a single tip on the inside flange. The single tip of the inside flange can point in the opposite direction from the two tips of the inside and outside flanges of the secondary seal. The outside flange of the primary seal can flow into a center channel section and does not have a free end. The seal element can form an annular channel for receiving the shelf.

A loading spring can be used with the primary seal and a loading spring can be used with a secondary seal and the two loading springs can be of the same type, of different types, of similar or different sizes. For example, one can be a canted coil spring and the other can be a ribbon spring or a combination ribbon spring having a canted coil spring located inside the ribbon spring.

Four sealing points can be provided between the seal assembly, the housing and the shaft, for a seal assembly with a primary seal and a secondary seal. Two sealing points can be at the primary seal and two can be at the secondary seal. The present seal assembly is well suited for low temperature applications where component shrinkage can be an issue. For example, in very low temperature applications, the seal element can shrink, which can cause the outside flange of the primary seal and the outside flange of the secondary seal to move away from the surface of the housing and the surface of the shelf.

When the seal element shrinks, the two inside flanges of the primary and secondary seals are further pressed against the surface of the shaft and the surface of the shelf. Thus, if fluid pressure is coming from the area of the primary seal and leaks across the interface at the outside flange of the primary seal and the outside flange of the secondary seal, fluid pressure can then be contained by the seal provided by the inner flange and the shelf surface to thereby assist with sealing fluid pressure under low temperature conditions where seal element shrinkage can be an issue.

A housing or gland can be provided with a shelf that is arranged away from the shaft for housing a seal assembly having a primary seal and secondary seal that are spaced radially from one another. In the present embodiment, each of the primary seal and the secondary seal can have inside and outside flanges each with a tip that points in the same direction. The inside flange of the primary seal cam seal against the shaft and the inside flange of the secondary seal can seal against the surface of the shelf. Material shrinkage can cause the inside flange of the primary seal to further press against the shaft and the inside flange of the secondary seal to further press against the surface of the shelf.

A housing or gland can be provided with a shelf. However, instead of utilizing a sealing element with a primary seal and a secondary seal with four tips from the two inside flanges and the two outside flanges of the primary and secondary seals, the present embodiment has a single tip for each of the primary seal and the secondary seal. Further, instead of pointing away from one another, the one tip from the primary seal and the one tip from the secondary seal point at one another. The outside sealing flange of the secondary seal and the outside flange of the primary seal are connected to one another by a seal bridge, which can be unitarily or singularly formed with the two outside flanges. The inside flange of the primary seal can seal against the shaft and the inside flange of the secondary seal can seal against the surface of the shelf. Material shrinkage can cause the inside flange of the primary seal to further press against the shaft and the inside flange of the secondary seal to further press against the surface of the shelf. A housing or gland can be provided with a shelf. However, instead of utilizing a sealing element in which the primary seal and the secondary seal both have outside flanges and loading springs with the housing with the shelf, the seal element of the present embodiment omits the loading springs and the outside flanges. Recognizing that in extremely low temperature applications the outside flanges will shrink and separate from the metal surfaces anyway, the present seal assembly omits the loading springs and omits the outside flanges.

In an example, the inside flange of the secondary seal forms a bore for sealing against the shelf and the inside flange of the primary seal forms a bore sealing against the shaft. The two inside flanges have tips that point away from one another. Thus, when the seal element of the present embodiment shrinks due to low temperature conditions, the seal assembly improvise its sealing ability by more tightly fitting around the shelf at the secondary seal and around the shaft at the primary seal. In particular, at low temperatures, the bore of the primary seal can shrink to more tightly seal against the shaft and the bore of the secondary seal can shrink to more tightly seal against the shelf.

WA seal assembly provided herein can comprise a seal element having seal body with an inside flange, an outside flange, and a center channel section, which together define a seal cavity. In the present embodiment, a locking ring can be used to secure the seal assembly in a gland. The locking ring can comprise a leaf spring formed by incorporating a notch into the body of the locking ring. The present seal assembly is usable in a sealing environment, such as in a housing or gland for sealing against a surface, such as a shaft that can rotate or reciprocate.

The locking ring can have a first section with the leaf spring and a second section extending from the first section. In some examples, a rounded or blunt contact edge may be used in an interference fit with the housing instead of the leaf spring. The second section can have a tip or end that extends into a channel or annular channel formed in the center channel section of the seal body of the sealing element.

The channel in the center channel section defines a receiving space. In an example, the end of the second section is provided with a lip or step for mechanically engaging a lip or step formed in the annular channel of the center channel section. The engagement between the two lips or step can ensure engagement of the locking ring and the seal element.

In low temperature applications wherein the seal element can shrink, shrinkage of the seal element especially at the annular channel can result in the lip of the annular channel more positively engaging the lip of the second section.

The second section of the locking ring can bisect the seal cavity into two compartments or smaller cavities for accommodating two loading springs. The loading spring can be used to bias the inside flange and another loading spring can be used to bias the outside flange.

The two loading springs can be of the same type, of different types, of similar or different sizes. For example, one can be a canted coil spring and the other can be a ribbon spring or a combination spring. In an example, both loading springs can be a combination ribbon spring having a canted coil spring located inside the ribbon spring, as discussed with reference to FIG. 3. Both loading springs can bias against the second section of the locking ring and whereas the lower loading spring biases against the inside flange, the upper loading spring can bias against the outside flange. The two loading springs can be located in the same seal cavity and can be configured to bias the inside flange and the outside flange away from one another. In an example, the locking ring, and more particularly the second section that bisects the seal cavity, can be configured to support both loading springs to enable the loading springs to bias outwardly against the inside flange and the outside flange, respectively.

The upper surface of the second section of the locking ring can be generally flat or planar. A locating groove may be incorporated with the upper surface or second surface to position the loading spring. The lower surface or first surface can be provided with a groove, which can have two sides and a bottom surface.

The lower loading spring can be in contact with the bottom surface of the groove but wherein the tapered sidewall of the groove can be spaced from the lower loading spring or can contact the lower loading spring to rotate or turn the lower loading spring when in an assembled state.

The outside flange of the seal element can be provided with a curved flange surface. The curved flange surface of the outside flange can resemble a section of the arc of the upper loading spring. The curved flange surface can decrease the contact strip or area of the outside flange to increase the sealing stress or force against a surface to seal against, such as a gland. For example, a flat surface can produce a line contact. However, a curved or rounded surface can produce a smaller or reduced area contact. Optionally or alternatively, a thinned out or reduced thickness section can be incorporated with the outside flange 122 by including a groove, similar to the groove shown in FIGS. 2 and 6.

The inside flange of the seal element can provided with a generally flat sealing lip with a moderate chamfer near the far end or the terminal end of the inside flange. The moderate chamfer instead of a flat section can reduce the contact area of the seal lip with the shaft to thereby increase the sealing stress when loaded by the lower spring against the shaft. Optionally or alternatively, a thinned out or reduced thickness section can be incorporated with the inside flange by including a groove and the loading spring biasing the sealing flange at the groove, where there thickness is relatively thinner than other parts of the sealing flange.

A seal assembly can comprise a seal element, a loading spring, an optional locking ring, and optional support rings, which can be made from metal bands similar to that described with reference to FIG. 10.

Like other seal elements described elsewhere herein, the seal element can comprise an inside flange, an outside flange, and a center channel section located between the two flanges, which together define a seal cavity. In an example, a center channel extension can be provided that lengthens the center channel section of the seal element along an axial direction. The seal element with the center channel extension can be used with a housing comprising a shelf. However, rather than incorporating a secondary seal with sealing lips with a loading spring for with the shelf, the present center channel extension can utilize projections or stubs to engage the shelf.

In an example, the center channel extension can comprise an outer surface and an inner surface, as viewed relative to one another and relative to the shaft. The outer surface can be provided with an enlarged projection and the inner surface can be provided with an enlarged projection as well as a stub. The enlarged projection can also be provided with the stub. The enlarged projections on the inner and outer surfaces can be provided to form an interference fit between the center channel extension and the bore defining the reduced space.

The stub can extend into the channel formed on or in the shelf. The configuration with the enlarged projections and the stub is configured to minimize leak paths by sizing the inner surface and the channel at the shelf so that that a seal is formed and a lock is provided during shrinkage of the seal element at low operating temperatures.

The engagement between the stub and the channel can assist in eliminating axial dislocation of the seal due to cryogenic temperatures. It is believed that small amounts of media trapped behind the back wall of the center channel extension can expand to force the stub and channel and the enlarged projections to further press against the housing and the shaft to increase sealing stress at low temperatures. In an example, an enlarged projection can also be incorporated on the outer exterior surface of the outside flange to create a region or section of high surface contact stress when that surface is biased outwardly by the loading spring to seal against the housing.

The present seal assembly is suited for use in cryogenic reciprocating applications. Further a lock ring, such as those described elsewhere herein, can be included to secure the seal assembly and prevent unwanted rotation.

A seal assembly provided in accordance with further aspects of the present invention can utilize a detent engagement to mechanically engage the seal element with the housing instead of using a stub along an intermediate portion on the center channel extension for engaging a channel. The detent can include a step on the seal element engaging a step on the housing.

In an example, a center channel extension of the present invention can comprise an outer surface and an inner surface, as viewed relative to one another and relative to the shaft. The outer surface can be provided with an enlarged projection and the inner surface can be provided with an enlarged projection as well as a stub. The enlarged projection can also be provided with the stub. The enlarged projections on the inner and outer surfaces can be provided to form an interference fit between the center channel extension and the bore defining the reduced space.

The stub can extend into the channel formed on or in the shelf. The configuration shown can be configured to minimize leak paths by sizing the inner surface and the channel at the shelf so that a seal can be formed and a lock is provided during shrinkage of the seal element at low operating temperatures.

The engagement between the stub and the channel can assist in eliminating axial dislocation of the seal due to cryogenic temperatures. It is believed that small amounts of media trapped behind the back wall of the center channel extension can expand to force the stub, the channel and the enlarged projections to further press against the housing and the shaft to increase sealing stress at low temperatures.

In an example, an enlarged projection can also be incorporated on the outer exterior surface of the outside flange to create a region or section of high surface contact stress when that surface is biased outwardly by the loading spring to seal against the housing.

The seal assembly of the present embodiment is suited for use in cryogenic reciprocating applications. Further a lock ring, such as those described elsewhere herein, can be include to secure the seal assembly and prevent unwanted rotation.

A seal assembly provided in accordance with further aspects of the present invention can be located in a gland and sealing against a shaft. The seal assembly can comprise a seal element and a loading spring. The seal element can have a first sealing flange, a second sealing flange, and a center channel section located therebetween, which together define a spring cavity. The loading spring can be located in the spring cavity and can be a V-spring, a canted coil spring, a ribbon spring, or a combination spring.

In an example, a normal straight shaft can be modified to include a shoulder having a shaft sealing surface. The seal element can be rotated so that the center channel center section of the seal element is now generally parallel to the axis of the shaft and the two sealing flanges are generally perpendicular to the axis of the shaft. As mounted in this rotated position, the seal assembly has two sealing contact points, one with the shoulder of the shaft and one with the housing.

The present seal assembly is configured for use in low temperature applications, such as cryogenic applications. By turning the seal element so that the sealing points are now rotated from normal, even if the seal element shrinks, the shrinkage does not cause the sealing flanges to separate from the housing and from the shoulder of the shaft. Instead, shrinkage will merely shifts the sealing points downward closer to the axis of the shaft. Thus, by rotating the orientation of the seal element and changing the locations of the sealing points, the present seal assembly is adapted to counteract possible seal element shrinkage in low temperature applications. The present seal assembly can be viewed as an axial seal, due to the rotation of the sealing element, for a radial application.

Methods of making and of using the seal assemblies and components thereof are within the scope of the present invention.

BRIEF DESCRIPTION OF THE DRAWINGS

These and other features and advantages of the present devices, systems, and methods will become appreciated as the same becomes better understood with reference to the specification, claims and appended drawings wherein:

FIG. 6 shows a section of a sealing environment about an axis of a shaft showing a housing, a shaft, and a seal assembly FIG. 7 is a detailed view of Section C of FIG. 6.

FIG. 8 shows a section of a sealing environment about an axis of a shaft showing a housing, a shaft, and a seal assembly.

FIG. 9 shows a section of a sealing environment about an axis of a shaft showing a housing, a shaft, and a seal assembly.

FIG. 22 shows a section of a sealing environment about an axis of a shaft showing a housing, a shaft, and a conventional seal assembly for radial application.

FIG. 23 shows a section of a sealing environment about an axis of a shaft showing a housing, a shaft, and a seal assembly.

FIG. 24 shows a section of a sealing environment about an axis of a shaft showing a housing, a shaft, and a conventional seal assembly for radial application.

FIG. 25 shows a section of a sealing environment about an axis of a shaft showing a housing, a shaft, and a seal assembly.

DETAILED DESCRIPTION

The detailed description set forth below in connection with the appended drawings is intended as a description of the presently preferred embodiments of seal assemblies provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

In the following description, numerous specific details are set forth to provide a more thorough description of the invention. It will be apparent, however, to one skilled in the pertinent art, that the invention may be practiced without these specific details. In other instances, well known features have not been described in detail so as not to obscure the invention. The claims following this description are what define the metes and bounds of the invention.

Figure 1:
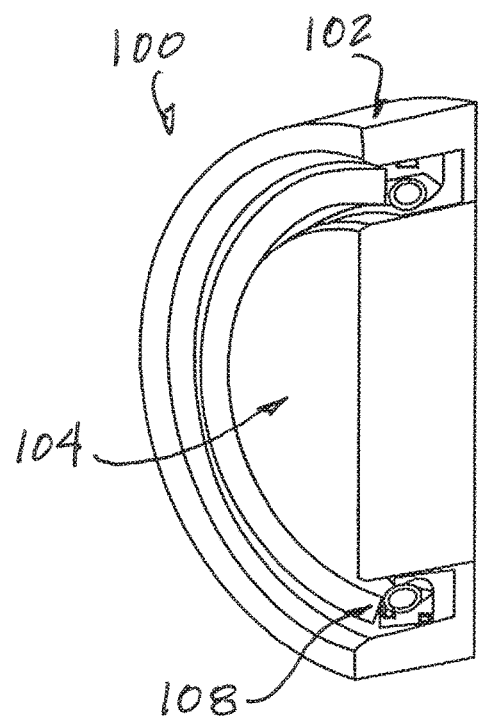
FIG. 1 shows a schematic cross-sectional perspective view of a sealing environment that includes a housing, a shaft, and a seal assembly.

With reference now to FIG. 1, a schematic cross-sectional perspective view of a sealing environment 100 showing a gland or housing 102 and a shaft or pin 104 with a seal assembly 108 located therebetween for providing a seal between the gland 102 and the shaft 104. In some examples, the surface to be sealed can be other than a shaft, such a plate or a flange. The shaft can be solid throughout or can have a hollow bore for fluid flow through the center thereof. The various components are understood as being round in configuration with only half of each being shown in the cross-sectional perspective view. The sealing environment 100 with the gland 102 and shaft 104 can represent any number of devices or assemblies, such as a valve, a pump, a piston or actuator, a compressor, a reciprocating device, a gear box, etc. The shaft can rotate, can reciprocate, or both rotate and reciprocate relative to the gland. In the present embodiment, the seal assembly 108 can include a seal element and one or more spring energizers, which can be a canted coil spring, a ribbon spring, or a combination canted coil spring and ribbon spring, one inside the other, as further discussed below. Optionally, a locking ring can be included. Optionally, a secondary seal can be included to enable an inside seal lip of the secondary seal to seal potential fluid leak from the outside seal lip of the primary seal for low temperature applications. For high temperature applications, the same arrange but wherein inner and outer seal lips are swapped due to expansion of the various components rather than shrinkage of the various components.

Figure 2:
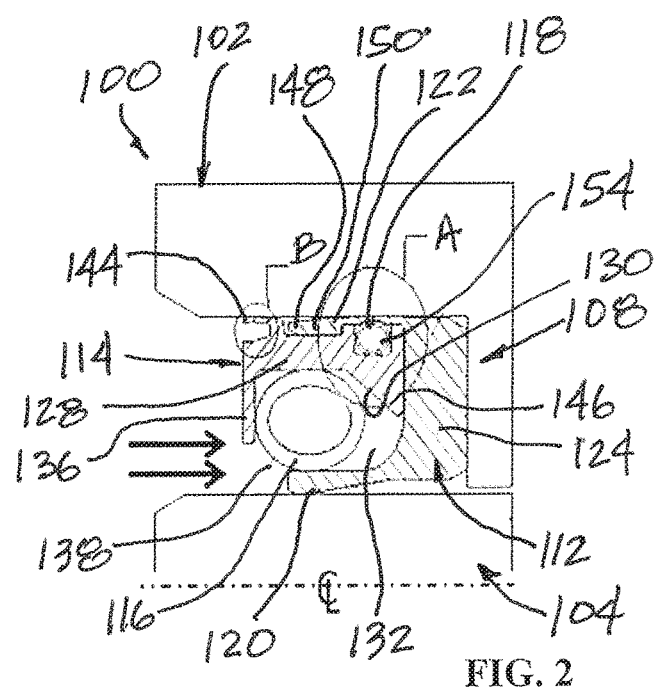
FIG. 2 shows a section of a sealing environment about an axis of a shaft showing a housing, a shaft, and a seal assembly.

FIG. 2 is a schematic cross-sectional side view of a section of a seal assembly 108 located inside a sealing environment 100. The sealing environment 100 can include a gland or housing 102 and a shaft 104. The seal assembly 108 is shown with a seal element 112, a locking ring 114, a seal loading spring 116, which can be called a primary or first loading spring, and a secondary or second loading spring 118.

As shown, the seal element 112 comprises an inside flange 120, an outside flange 122, and a center channel section 124, which together define a seal cavity for accommodating a loading spring. The terms inside and outside are relative to one another and to the shaft 104, such as to the centerline of the shaft. The inside flange 120 has an inner exterior surface defining a sealing lip for sealing against the surface of the shaft 104 and an inner interior surface that contacts the primary loading spring 116. The outside flange 122 has a sealing lip for sealing against the surface of the gland 102. The outside flange 122 has an outer exterior surface defining a sealing lip for sealing against the surface of the gland 102 and an outer interior surface that contacts the locking ring 114 and the second loading spring 118, as further discussed below. The locking ring 114 can comprise a body 128 having a shaped inner surface 130 that together with the inside flange 120 define a contour of a primary spring cavity, seal assembly cavity, or seal cavity 132 to accommodate the primary loading spring 116. The cavity 132 can be called a spring cavity since it is sized and shaped to receive a spring. The cavity 132 can also be called a seal cavity since the cavity is defined by the sealing element. The primary loading spring 116 is shown in a spring ring configuration, where the spring's two ends are connected into a ring shape, and biased against the inner inside flange 120 of the seal element 112 as well as the shaped inner surface 130 of the locking ring 114.

As shown, the shaped inner surface 130 has a tapered section closest to the center channel section 124 of the seal element 112 and a flat section having a surface that is generally parallel to the surface of the shaft 104. The location of the tapered section can help to control the axial location or position of the primary loading spring 116 within the spring cavity 132, such as by contacting and biasing the primary spring 116 towards the radial lip 136 of the locking ring. In the example shown, the primary loading spring 116 is in contact with the inside flange 120, the shaped inner surface 130 and the radial lip 136. The length of the radial lip 136 can vary and the radial lip can be an optional feature and when incorporated, reduces the size of the entry opening 138 to the spring cavity 132 to inhibit dislodgment of the primary spring 116 from the spring cavity 132. An insert edge 146 opposite the radial lip 136 is configured to contact the center channel section 124 of the seal element 112.

The locking ring 114 has an extending lip or finger defining a leaf spring 144 formed by incorporating a notch into the body of the locking ring 114. The leaf spring 144 has a free end that points in the direction away from the seal element 112, or towards the direction of pressure shown in the present embodiment with double arrows. In other examples, the notch can be located elsewhere in the body of the locking ring so that the finger of the leaf spring 144 points in the direction of the seal element, as shown with reference to FIGS. 6 and 7. The leaf spring 144 is located along an outer periphery of the locking ring so as to bias against the gland 102 when installed therein, and not be limited by other parts of the locking ring. The leaf spring provides biasing force between the locking ring and the housing to restrict the seal assembly from rotating. In other examples, a rounded tip on the radial contact end of the locking ring can engage the housing by interference rather than a leaf spring.

A first groove 148 is provided on the locking ring 114 along the outer periphery of the locking ring adjacent the leaf spring 144. The first groove 148 can be continuous about the central axis of the seal assembly, which is generally coincident with the axis of the shaft. The first groove 148 can have a generally three-sided rectangular shape with optional chamfered corners and configured to engage an enlarged lip portion or step 150 on the outside flange 122 of the seal element 112. The first groove 148 can be larger than the enlarged lip portion 150, such as being longer or wider, to facilitate engagement between the two. The engagement between the first groove 148 and the enlarged lip portion 150 minimizes the possibility of separation between the locking ring and the seal element, such as during assembly of the seal assembly 108 or when installing the seal assembly into the gland.

A second groove 154 is provided on the locking ring 114 along the outer periphery of the locking ring adjacent the first groove 148. As shown, the second groove 154 has a generally three-sided rectangular or square shape that can be selected or sized to accommodate the second loading spring 118. As shown, the second loading spring 114 is biased against the bottom surface of the second groove 154 and against the outer interior surface of the outside flange 122 to urge the outer exterior surface of the outside flange 122 of the seal element 112 against the surface of the gland 102 to provide a seal therebetween.

The present seal assembly is adapted for low extreme temperature applications by using materials that can be fabricated to a desired size and shape and be supported structurally using one or more biasing springs. Low cryogenic temperatures can range from −459° F. to high temperatures operating at 450° F. or anywhere in between. In an example, plastic material is selected for the seal element along with using small thicknesses that can provide surface deflection at low temperatures yet have a sufficient spring force to bring the sealing surfaces in contact with the metal surfaces, such as stainless steel surfaces used for the gland and shaft. The selected plastic can remain relatively flexible at the sealing temperature and along with targeted sealing stress can generate the needed surface contacts for an adequate seal to counteract against shrinkage along the outside sealing flange 122.

In an example, the plastic material selected for use as the sealing element can fall in the class of fluoropolymers. The degree of flexibility of the plastic can also depend in part of the thickness of the sealing area and the sealing stress provided on that area to bring the seal in contact with the metal sealing surface. The thickness can be that of the inside flange 120 and of the outside flange 122 of the sealing element 112 against the metal surface.

In an example, the sealing area can be provided with a sealing thickness of approximately 0.0004 inch to 0.007 inch. This measurement can also be referred to as the thinness of the sealing flange to enable the sealing flange to still be manipulated by the loading spring even when under extremely low temperatures. The upper range of the thickness can extend a larger value, such as to 0.011 to 0.015 inch. However, the final sealing thickness can depend on a number of factors, including the operating temperature and the selected material. In general, the lower the temperature, the thinner the material should be to provide the flexibility needed to effect sealing. An exemplary fluoropolymer that can be used is ultra-high molecular weight (UHMW) fluoropolymer. In a particular example, UHMW polyethylene can be selected for the sealing element 112.

In an example, the primary loading spring 116, the secondary loading spring 118, or both the primary and the secondary loading springs can be a canted coil spring, a ribbon spring, one of each, or a combination ribbon spring and canted coil spring. Canted coil springs and ribbon springs, separately, are well known in the spring industry or field. For example, canted coil springs are disclosed in U.S. Pat. No. 5,139,276, the contents of which are expressly incorporated herein by reference. Each canted coil spring, which can have a length configuration with two free ends or a ring configuration in which the two ends are connected, comprises a plurality of interconnected coils with each coil pre-canted along the same canting direction and along a selected canting angle. When biased by a force applied tangential to the coil axis, the coils will further cant in the same canting direction. This unique characteristic of canted coil springs cannot be found in standard helical extension springs, which only expand or contract.

Helical ribbon springs are readily searchable using the term "ribbon spring" or "helical ribbon spring" using various internet search engines. In the present embodiment, a combination ribbon spring and canted coil spring located inside the coils of the ribbon spring can be used as a spring assembly and can have the benefit of providing a large contact area between the individual coils of the ribbon spring and the seal element. At extreme temperature conditions, the relatively larger contact areas of the coils of the ribbon spring, which is tape-like, versus typical round wires of a canted coil spring, can minimize embedding or sinking of the coils into the surface of the seal element.

The canted coil spring located inside the ribbon spring in the combination spring assembly 158 (FIG. 3) can have a generally constant force over a range of deflection of the coils and therefore can provide additional force for the overall combination spring assembly and the spring assembly therefore offers more total spring force than a single spring could provide. The canted coil spring may also provide support to the ribbon spring to prevent deformation of the ribbon spring at higher deflection amounts where a ribbon spring alone, such as the coils of the helical ribbon spring, could permanently deform. The coils of the inner canted coil spring can therefore support the compression or load experienced by the coils of the outer helical ribbon spring. Additionally, because the width of each coil of the helical ribbon spring is relatively wider or larger than the width of each coil of a typical canted coil spring, the ribbon spring may provide a larger surface of contact for loading onto a surface, such as the surface of a seal element, to energize a seal lip in certain cases where a canted coil spring alone could embed or dig into the seal material or create large gaps between where the coils of the canted coil spring contact the seal element. The combination spring assembly 158 is shown schematically in FIG. 3, which shows a coil 160 of a ribbon spring 162 and a coil 164 of a canted coil spring 166 located within the coil of the ribbon spring. The combination spring assembly 158 can be in a ring configuration with the ends of the ribbon spring and/or the ends of the canted coil spring connected.

The seal assembly of FIG. 2 is configured so that upon assembly, the primary loading spring 116 and the secondary loading spring 118 are loaded to apply appropriate sealing force to affect sealing. The sealing stress applied to the inner and outer sealing flanges can depend on the temperature that the seal assembly is to be used. For cryogenic temperatures, the sealing stress could be as high as around 5000 psi. For high temperature applications, in the order of 350° F. or higher, the sealing stress could be as low as 50 psi, depending on the fluid being sealed and the material of the seal. In general, the lower the temperatures, the higher is the sealing stress and the smaller is the sealing thickness to affect sealing. For higher temperatures, the lower is the sealing stress required to affect sealing and the sealing thickness can be relatively larger than for providing a good seal at lower temperatures.

Figure 4:
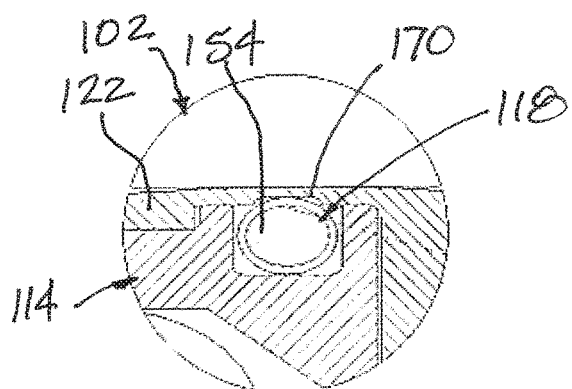
FIG. 4 is a detailed view of Section A of FIG. 2.

With reference now to FIG. 4, a detailed view of Section A of FIG. 2 is shown. The secondary loading spring 118 is shown biased against the bottom surface of the second groove 154 of the locking ring and against the outer interior surface of the outside flange 122 to apply a load on the outside flange to seal against the gland 102. In an example, the outer interior surface of the outside flange 122 has a groove 170 and the secondary loading spring 118 contacts the outside flange 122 at the groove 170. The groove 170 is incorporated to thin-out the section of the outside flange so that the spring 118 can apply an increased stress or load to the outside flange to seal against the gland, which can increase the loading stress on the outside flange in low temperature applications to counteract shrinkage and to maintain a seal against the housing. Depending on the application temperature, the sealing thickness of the outside flange 122 at the groove 170 is approximately 0.0004 inch to 0.007 inch. The upper range can extend a larger value, such as to 0.011 to 0.015 inch when the temperature is higher and depending on the material selection for the sealing element. Other thickness range is contemplated for higher operating temperatures and for different plastic materials.

Figure 5:
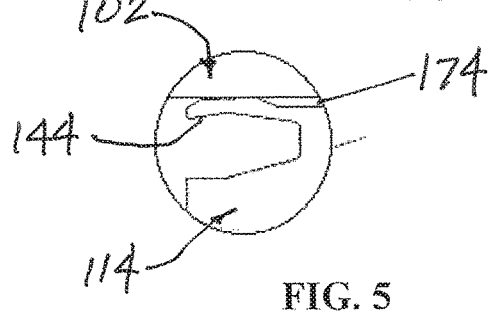
FIG. 5 is detailed view of Section B of FIG. 2.

With reference now to FIG. 5, a detailed view of Section B of FIG. 1 is shown. The leaf spring 144 is shown biasing against the gland 102. The leaf spring 144 extends radially outward to ensure contact between the leaf spring and the gland. Thus, a gap 174 can clearly be seen adjacent the leaf spring, between the gland and the locking ring 114.

With reference again to FIGS. 1-5, for low temperature applications, such as in cryogenic operating range, the various components shown will shrink with the sealing element, made of a fluoropolymer material, shrinking a greater amount than the gland, the locking ring, the springs, and the shaft, which are typically made from a metal material such as stainless steel. The shrinkage at cryogenic operating range is in the order of about 10 to 1 for plastic to metal. Consequently, a potential leakage path can open up due to the shrinkage rates of the outside flange 122 of the seal element and the gland 102. In the present embodiment, the potential leakage path can be minimized by incorporating a relatively thin area on the outside flange, such as in the area of the groove 170 of the outside flange 122. An appropriately sized stress load can be provided at the thin area of the groove 170 to ensure sufficient biasing force to the outside flange to press the thin area of the outside flange against the housing or gland. In an example, the biasing stress can be in the order of 3000 psi and higher, up to about 5000 psi or higher. For high temperature applications, such as in the order of 350° F. or higher. All components will expand. Thus, a potential leakage path can open up along the inside diameter of the seal assembly due to the expansion of the inside flange 120 of the seal element 112 and the shaft 104. In the present embodiment, the potential leakage path can be minimized by incorporating a spring assembly for the primary loading spring 116 that has a large deflection operating range to bias the inside flange into sealing contact with the shaft despite the material expansion of the sealing element. As discussed above, the required stress to seal the inside flange of a seal element against the shaft due to expansion at high temperatures is much lower than when sealing the outside flange of the seal element against the housing due to shrinkage at low temperatures.

FIG. 6 shows a seal assembly 108 in accordance with alternative aspects of the present invention, located in a sealing environment 100. The present seal assembly 108 is similar to the seal assembly of FIG. 2 with a few exceptions. In the present embodiment, the locking ring 114 has been modified to incorporate a leaf spring 144 having a finger that points in the direction of the center channel section 124 of the sealing element 112. The locking ring 114 also incorporates a groove 178 along an outer periphery of the body 128 instead of two separate grooves for the locking ring of FIG. 2. The groove 178 of the present embodiment can have three sides with one of the sides located near a recess for forming the leaf spring 144. The side of the groove 178 adjacent the recess is taller or larger in dimension than the opposite side. The groove edge with the shorter dimension is engaged to a lip or shoulder formed on the outside flange 122 at point 177. In the present embodiment, the groove 178 on the locking ring 114 is sized and shaped to both engage the outside flange 122 of the sealing element and to accommodate a secondary loading spring 118.

As shown, the far tip of the outside flange 122 is a hook-like terminal end 188, which has three sides and an open side to receive the secondary loading spring 118. The secondary loading spring 118 is positioned within the three-sided groove 187 of the terminal end 188 of the outside sealing flange and the three-sided groove 178 of the locking ring 114. Regarding the three-sided groove 187 of the terminal end 188, the bottom surface between the two sides present a thin part or section of the outside sealing flange 122 that is thinner than other parts of the outside flange, such as when comparing to the section of the outside flange near the intersection with the center channel section 124. This relatively thinner part or section provides the same or similar function as the thin part of the groove 170 of FIG. 4.

The groove 187 of FIG. 6 is incorporated to thin-out the section of the outside flange 122 so that the spring 118 can apply an increased stress or load to the outside flange to seal the outside flange 122 against the gland, which can be problematic at low cryogenic temperatures. Depending on the operating temperature of the application, the sealing thickness of the outside flange at the groove 187 is approximately 0.0004 inch to 0.007 inch. The upper range can extend a larger value, such as to 0.011 to 0.015 inch when the temperature is higher. Other thickness range is contemplated for higher operating temperatures.

With reference now to FIG. 7, a detailed view of Section C of FIG. 6 is shown. The leaf spring 144 can be shown biasing against the gland 102. The leaf spring 144 extends radially outward to ensure appropriate contact between the leaf spring and the gland for securing the seal assembly to the gland. Thus, a gap 174 can clearly be seen adjacent the leaf spring, between the gland and the locking ring 114.

For other seal assemblies and seal assembly components disclosed herein, it is understood that where a feature is shown but not expressly described and is otherwise the same or similar to the feature or features described elsewhere, such as above with reference to FIGS. 1-7, the disclosed part or parts shown in all the drawing figures but not expressly described because of redundancy and because knowledge is built on a foundation laid by earlier disclosures may nonetheless be understood to be described or taught by the same or similar features expressly set forth in the text for the embodiments in which the feature or features are described. Said differently, subsequent disclosures of the present application are built upon the foundation of earlier disclosures unless the context indicates otherwise. The disclosure is therefore understood to teach a person of ordinary skill in the art the disclosed embodiments and the features of the disclosed embodiments without having to repeat similar components and features in all embodiments since a skilled artisan would not disregard similar structural features having just read about them in several preceding paragraphs nor ignore knowledge gained from earlier descriptions set forth in the same specification. As such, the same or similar features shown in the following seal assemblies incorporate the teachings of earlier embodiments unless the context indicates otherwise. Therefore, it is contemplated that later disclosed embodiments enjoy the benefit of earlier expressly described embodiments, such as features and structures of earlier described embodiments, unless the context indicates otherwise.

With reference now to FIG. 8, a seal assembly 108 in accordance with further aspects of the present disclosure is shown located in a gland 102 for sealing against a shaft 104. The present seal assembly 108 is similar to the seal assemblies of FIGS. 2 and 7. In the present embodiment, the locking ring 114 incorporates a leaf spring 144 having a finger that points away from the center channel section of the seal element 112, similar to that of FIG. 2, and wherein the outside flange 122 incorporates a three-sided groove 187 and the locking ring incorporates a three-sided groove 178, similar to that of FIG. 7. In the present embodiment, a locating groove 184 is provided at the bottom surface of the groove 178 of the locking ring 114. The locating groove 184 helps to locate the secondary loading spring 118 therein, to restrict axial movement of the loading spring 118 within the width of the groove 178. The locating groove 184 within the holding groove 178 can have a V-shape or can have a V-shape with a subtended surface between the two tapered surfaces.

FIG. 9 shows yet another seal assembly 108 in accordance with further aspects of the present invention. The seal assembly 108 is shown located in a sealing environment 100, which comprises a gland 102 and a shaft 104. The present seal assembly 108 is similar to the seal assembly of FIG. 2. However, in the present embodiment, the seal assembly 108 is shaft mounted rather than housing mounted as shown in FIG. 2. That is, the seal assembly 108 of the present embodiment is installed onto the shaft 104 with the locking ring then used to lock to the surface of the shaft 104 to prevent rotation relative to the shaft. In the present embodiment, the outside flange 122 of the seal element 112, which is outside relative to the inside flange 120 and to the shaft axis, is configured to seal against the surface of the gland, analogous to the inside flange 120 of FIG. 2 sealing against the surface of the shaft 104. The seal assembly 108 of FIG. 9 can rotate or reciprocate with the shaft 104 and seal against the surface of the gland 102. The arrows show the direction of pressure.

Figure 10:
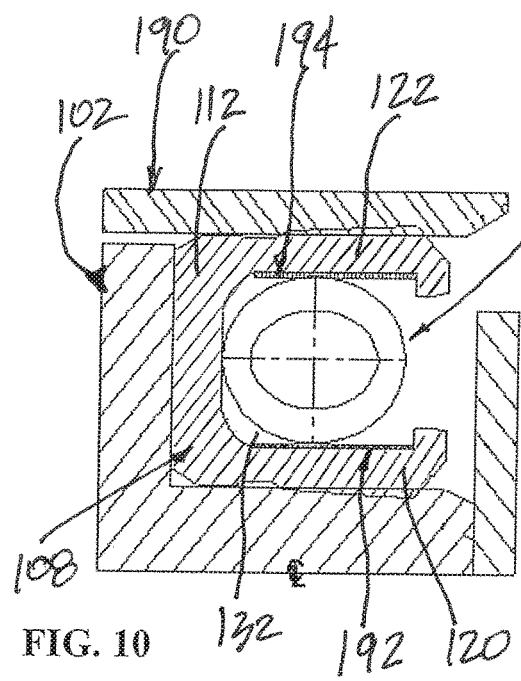
FIG. 10 shows a section of a sealing environment showing a housing, a shaft, and a surface to seal against, such as a plate or a shaft.

With reference now to FIG. 10, a seal assembly 108 provided in accordance with aspects of the present invention is shown. The seal assembly 108 of the present embodiment is shown located in a gland 102 for sealing against a surface 190, such as a shaft or a stationary plate or flange. The present seal assembly 108 comprises a seal element 112, a loading spring 116, and a pair of support rings 192, 194, which can be made from metal bands. Like other seal elements described elsewhere herein, the seal element 112 comprises an inside flange or inside sealing flange 120, an outside flange or outside sealing flange 122, and a center channel section 124 located between the two flanges. In the present embodiment, an inside support ring 192 in the form of a band is provided on the inner interior surface of the inside flange 120 and in contact therewith. An outside support ring 194 in the form of a band is provided on the outer interior surface of the outside flange 122 and in contact therewith. The outside support ring 194 has a larger diameter than the inside support ring 192 and both support rings are located within the seal cavity 132. The present seal assembly 108 may be used in any number of sealing environments 100 in extreme temperature applications.

The two support rings 192, 194 are configured to serve as protective sheaths, layers, or barriers for the inner interior surface of the inside flange 120 and the outer interior surface of the outside flange 122, respectively. As the primary loading spring 116 bears against the inside and outside flanges 120, 122 and biases them outwardly away from one another, the biasing force of the individual coils of the loading spring 116 does not embed or bury into the relatively softer material of the sealing element. The support rings 192, 194 can also support to reduce the seal element shrinkage in low temperature applications, such as −320° F. and below. The support rings 192, 194 shown and described can be used with any seal element described elsewhere herein where a loading spring biases the inner and outer sealing flanges of the seal element away from one another.

In an example, one or both support rings 192, 194 can be provided with scurf cuts on the surfaces thereof. A scurf cut generates a rough, scaly or flaky surface that can help to improve gripping and friction between the support rings and the respective sealing flanges of the seal element 112. The support rings 192, 194 of the present embodiment are configured to protect or shield the sealing element 112, such as the outer interior surface of the outside sealing flange and the inner interior surface of the inside sealing flange, from possible embedding or protrusion from the coils of the loading spring.

Figure 3:
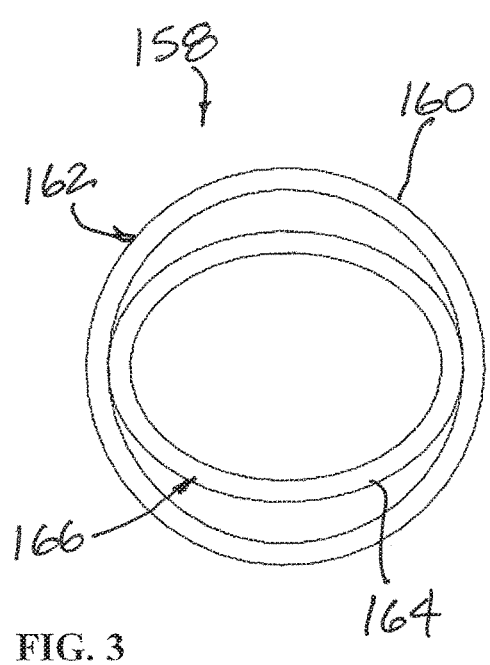
FIG. 3 shows a spring assembly for use with a seal assembly, showing a coil of a canted coil spring located inside a coil of a ribbon spring.

The loading spring 116 can be a canted coil spring, a ribbon spring, or a combination spring in which the canted coil spring is located within the coils of the ribbon spring, as shown in FIG. 3. Optionally, a V-spring can be used for the loading spring 116. The seal element of FIG. 10 can be made from PTFE, UHMW fluoropolymer, or other suitable plastic materials.

Figure 11:
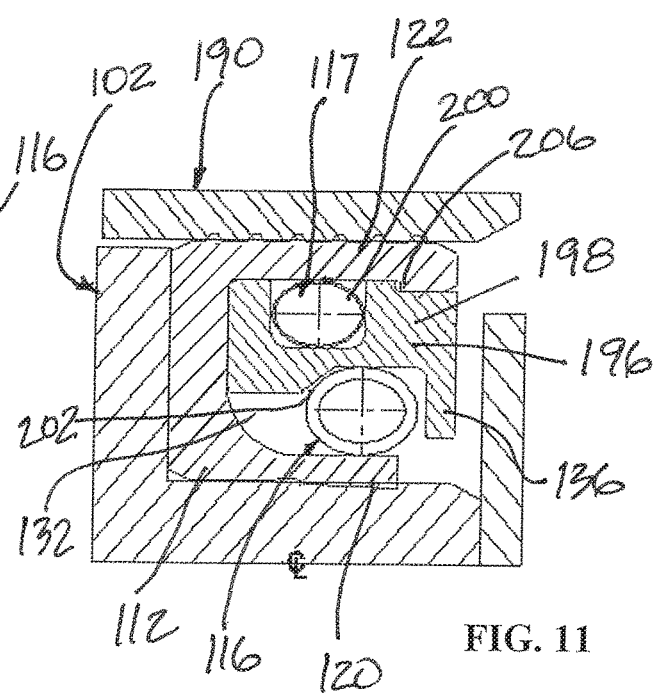
FIG. 11 shows a section of a sealing environment showing a housing, a shaft, and a surface to seal against, such as a plate or a shaft.

With reference now to FIG. 11, a seal assembly 108 provided in accordance with further aspects of the present invention is shown. The seal assembly 108 of the present embodiment is shown located in a gland 102 for sealing against a surface 190, such as a shaft or a stationary plate or flange. The present seal assembly 108 comprises a seal element 112, a metal band 196, and two loading springs 116, 117. The two loading springs 116, 117 can be of the same type and same size or can be of different types and the same or different size. For example, one loading spring can be a canted coil spring and the other loading spring can be a combination spring or a V-spring.

The present seal element 112 comprises an inside flange 120, an outside flange 122, and a center channel section 124 located between the two flanges. The two loading springs 116, 117 are provided for biasing the two sealing flanges away from one another, one for biasing the inside flange 120 and one for biasing the outside flange 122. Support rings, such as those rings 192, 194 shown in FIG. 10, may be used with the seal assembly of the present embodiment.

The metal band 196 of the present embodiment comprises a body 198 having two spring grooves 200, 202. As shown, the outside flange 122 has a lip that engages a lip on the metal band at point 206 to retain the metal band and therefore the two loading springs 116, 117 in place. The first groove 200 can have three sides and is generally U-shape along a side cross-section. The first groove 200 receives one of the loading springs 117 therein to bias against the outer interior surface of the outer flange 122.

The second groove 202 of the metal band 196 has an extended radial extending lip 136 forming one of the three sides of the groove 202. The side opposite the radial extending lip 136 can be tapered as shown for turning or rotating the coils of the loading spring 116 or can be generally square or rectangular. The second groove 202 receives the second loading spring 116 to bias the inside flange outwardly against a surface to be sealed.

The inner and outer sealing flanges and the center channel section define a seal cavity 132. By utilizing two loading springs 116, 117 within the same seal cavity 132 and combining the force deflection characteristics of both springs, the overall working range of the two springs can generate a generally constant force over a larger range of deflection than for a single loading spring. Thus, in low temperature applications wherein shrinkage can be an issue, having two loading springs can allow the outer loading spring 117 to load against the outside flange 122 to force the outside flange to seal against the metal surface 190. Optionally, a groove having a reduced or thinned out section can be provided on the outside flange 122 as disclosed with reference to FIGS. 2, 6, 8, and 9. This thinned out section can allow a loading spring to load the outside loading flange to generate a high sealing stress to force the outside flange to seal against the metal surface even under low temperature applications.

Figure 12:
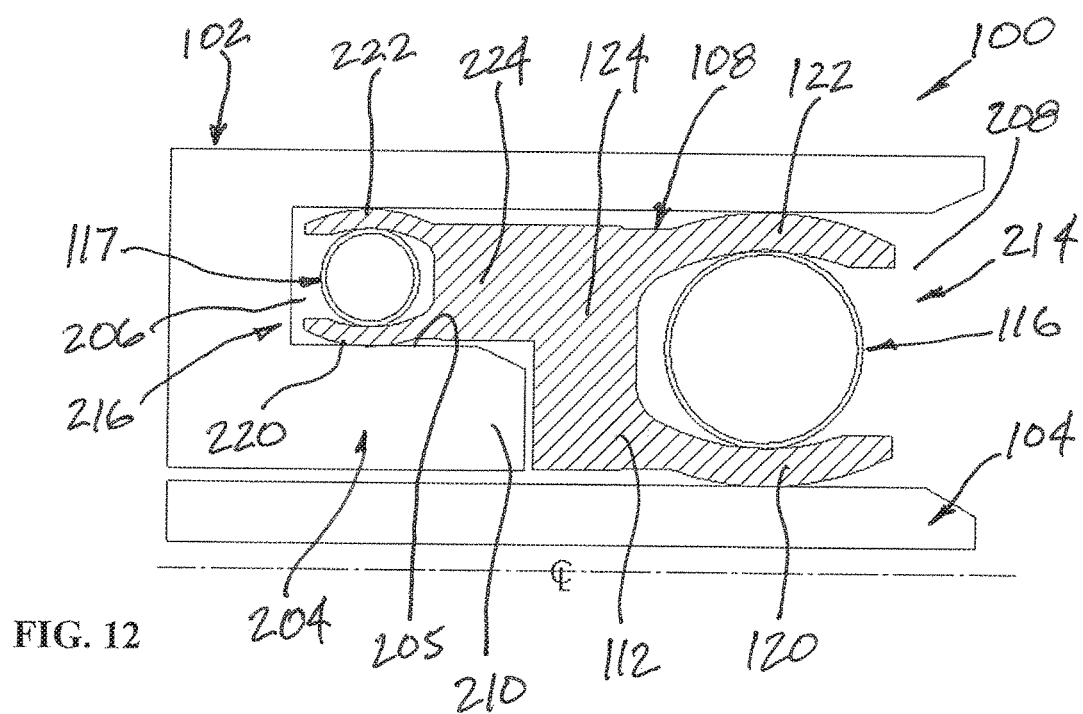
FIG. 12 shows a section of a sealing environment about an axis of a shaft showing a housing, a shaft, and a seal assembly.

With reference now to FIG. 12, a seal assembly 108 provided accordance with still further aspects of the present invention is shown in a sealing environment 100 comprising a gland or housing 102 and a shaft 104. In the present embodiment, the housing or gland 102 is provided, such as machined or cut, with a shelf 204 to form a reduced or secondary space 206 adjacent a standard spring space 208 inside the housing 102 for accommodating a spring assembly. For example, the housing 102 can be solid or cast with a recess and then further cut or machined to define the secondary space 206 and form the shelf 204. The shelf 204 can include a shelf surface 205 and a tip or nose section with a chamfered tip 210. The inner surface of the shelf 204 can define a bore for receiving the shaft 104.

As shown, the seal assembly 108 comprises a seal element 112 having two opposed sets of sealing lips from a primary seal 214 and a secondary seal 216. The primary seal 214 comprises a primary inside flange 120, a primary outside flange 122, and a center channel section 124. The secondary seal comprises a secondary inside flange 220, a secondary outside flange 222, and a secondary center channel section 224. Each sealing flange has a tip. The two tips of the two sealing flanges of the primary seal 214 and the two tips of the two sealing flanges of the secondary seal 216 point away from one another. As shown, the primary seal 214 and the secondary seal 216 are unitarily formed from a single material, such as from a same plastic material. Optionally, two different sets of support rings, such as those shown in FIG. 10, may be used with the primary and secondary seals of the present embodiment.

The loading spring 116 used with the primary seal 214 and the loading spring 117 used with the secondary seal 216 can be of the same type, of different types, of similar or different sizes. For example, one can be a canted coil spring and the other can be a ribbon spring or a combination ribbon spring having a canted coil spring located inside the ribbon spring, as discussed with reference to FIG. 3.

As shown in FIG. 12, four sealing points, one at each sealing flange, are provided by the primary seal 214 and two at the secondary seal 216. The present seal assembly 108 is well suited for low temperature applications where component shrinkage can be an issue. For example, in very low temperature applications, the seal element 112 can shrink, which can cause the outside flange 122 of the primary seal 214 and the outside flange 222 of the secondary seal 216 to move away from the surface of the housing 102. However, when the seal element 112 shrinks, the two inside flanges 120, 220 of the primary and secondary seals are further pressed against the surface of the shaft 104 and the shelf surface 205, respectively. Thus, if fluid pressure is coming from the area of the primary seal and leaks across the interface at the outside flange 122 of the primary seal and the outside flange 222 of the secondary seal due to material shrinkage, fluid pressure is then contained by the seal provided by the inner flange 220 of the secondary seal 216 and the shelf surface 205. Thus, inclusion of the secondary seal for sealing against a shelf can counteract material shrinkage at low operating temperatures. The present seal assembly 108 takes advantage of shrinkage to improve sealing along inside flanges 120, 220 and compensate for potential leaks along the outer flanges 122, 222. As shown and described with reference to FIG. 12, every leakage path that can ultimately leak out to the environment must pass through a surface that is sealed by an energized inside flange sealing lip.

Figures 13, 14:
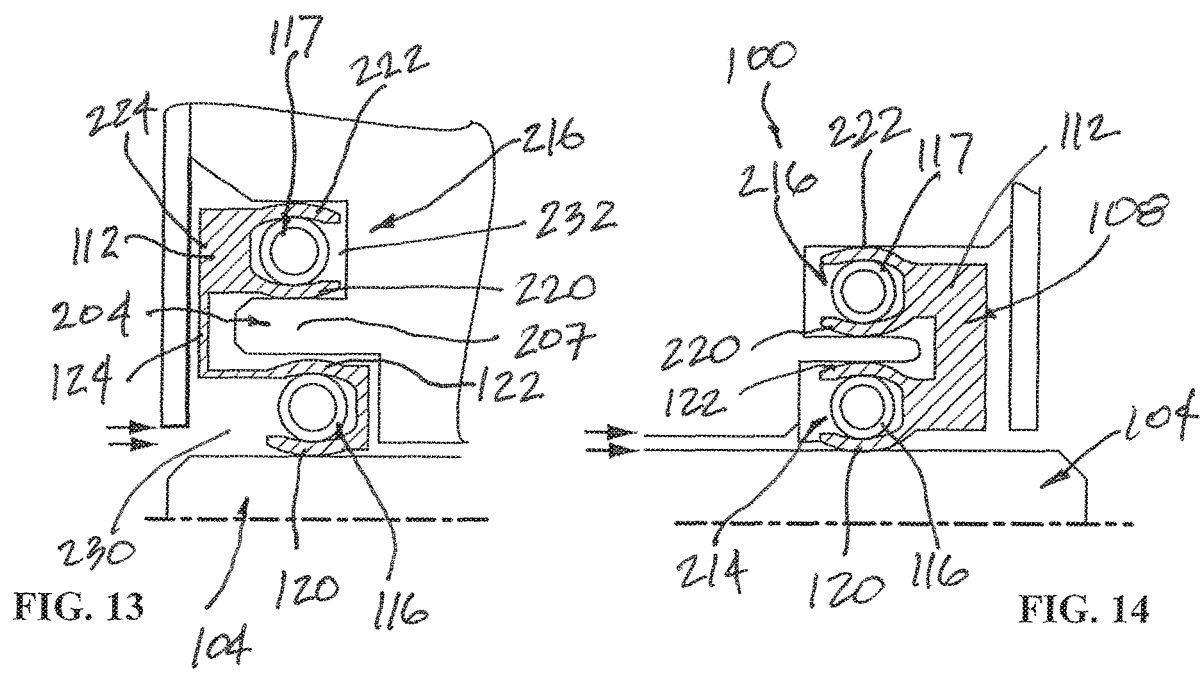
FIG. 13 shows a section of a sealing environment about an axis of a shaft showing a housing, a shaft, and a seal assembly.
FIG. 14 shows a section of a sealing environment about an axis of a shaft showing a housing, a shaft, and a seal assembly.

With reference now to FIG. 13, a seal assembly 108 provided accordance with still further aspects of the present invention is shown in a sealing environment 100 comprising a gland or housing 102 and a shaft 104, similar to the seal assembly of FIG. 12. In the present embodiment, the housing or gland 102 is provided, with a shelf 204 that is arranged away from the shaft 104 for housing a seal assembly 108 having a primary seal 214 and secondary seal 216 that are radially spaced from one another, relative to the shaft axis, instead of axially from one another as shown in FIG. 12. In the present embodiment, the position of the shelf 204 creates two distinct cavity spaces or sections 230, 232 for accommodating the primary seal 214 and the secondary seal 216 of the seal assembly.

The shelf 204 in the present embodiment is provided with an elongated body 207 that embodies a rod or pin shape in cross-section. The nose tip of the shelf 204 can be chamfered. The seal element 112 surrounds the elongated body 207. As shown, the seal assembly 108 comprises a seal element 112 having two opposed sets of sealing lips from a primary seal 214 and a secondary seal 216. The primary seal 214 comprises a primary inside flange 120, a primary outside flange 122, and a center channel section 124. The secondary seal comprises a secondary inside flange 220, a secondary outside flange 222, and a secondary center channel section 224. As shown, the primary seal and the secondary seal are unitarily formed from a single material, such as from a same plastic material. Optionally, two different sets of support rings, such as those shown in FIG. 10, may be used with the primary and secondary seals of the present embodiment. Unlike the embodiment of FIG. 12, the primary seal 214 of the present embodiment only has a single tip on the inside flange 120. The single tip of the inside flange 214 points in the opposite direction from the two tips of the inside and outside flanges of the secondary seal 220. The outside flange 122 of the primary seal flows into a center channel section and does not have a free end. The seal element forms an annular channel for receiving the shelf.

The loading spring 116 used with the primary seal 214 and the loading spring 117 used with the secondary seal 216 can be of the same type, of different types, of similar or different sizes. For example, one can be a canted coil spring and the other can be a ribbon spring or a combination ribbon spring having a canted coil spring located inside the ribbon spring, as discussed with reference to FIG. 3.

As shown, four sealing points are provided between the seal assembly 108, the housing and the shaft, two at the primary seal 214 and two at the secondary seal 216. The present seal assembly 108 is well suited for low temperature applications where component shrinkage can be an issue. For example, in very low temperature applications, the seal element 112 can shrink, which can cause the outside flange 122 of the primary seal and the outside flange 222 of the secondary seal to move away from the surface of the housing and the surface of the shelf. However, when the seal element 112 shrinks, the two inside flanges 120, 220 of the primary and secondary seals are further pressed against the surface of the shaft 104 and the shelf surface 205, respectively. Thus, if fluid pressure is coming from the area of the primary seal and leaks across the interface at the outside flange 122 of the primary seal and the outside flange 222 of the secondary seal, fluid pressure is then contained by the seal provided by the inner flange 220 and the shelf surface 205 to thereby assist with sealing fluid pressure under low temperature conditions where seal element shrinkage can be an issue.

With reference now to FIG. 14, a seal assembly 108 provided accordance with still further aspects of the present invention is shown in a sealing environment 100 comprising a gland or housing 102 and a shaft 104, similar to the seal assembly of FIGS. 12 and 13. In the present embodiment, the housing or gland 102 is provided, with a shelf 204 that is arranged away from the shaft 104 for housing a seal assembly 108 having a primary seal 214 and secondary seal 216 that are spaced radially from one another, similar to that of FIG. 13. In the present embodiment, each of the primary seal 214 and the secondary seal 216 has inside and outside flanges each with a tip that points in the same direction. Like the embodiment of FIGS. 12 and 13, the inside flange of the primary seal seals against the shaft and the inside flange of the secondary seal seals against the surface of the shelf. Material shrinkage can cause the inside flange 120 of the primary seal 214 to further press against the shaft and the inside flange 220 of the secondary seal 216 to further press against the surface of the shelf 204.

Figure 15:
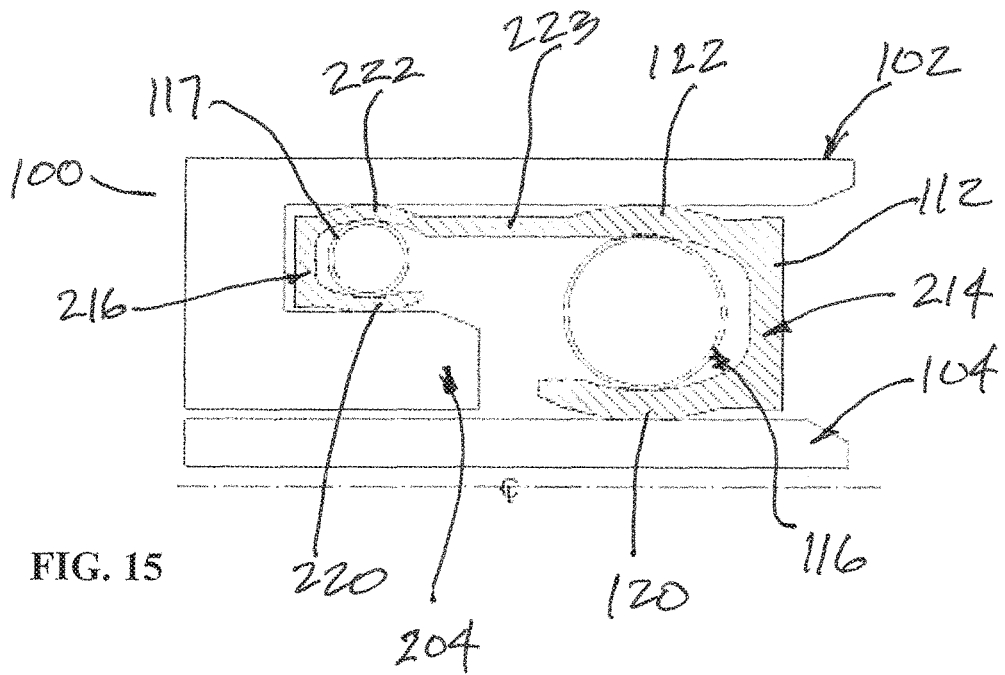
FIG. 15 shows a section of a sealing environment about an axis of a shaft showing a housing, a shaft, and a seal assembly.

With reference now to FIG. 15, a seal assembly 108 provided accordance with still further aspects of the present invention is shown in a sealing environment 100 comprising a gland or housing 102 and a shaft 104, similar to the seal assembly of FIGS. 12-14. In the present embodiment, the housing or gland 102 is provided with a shelf 204 that is similar to the shelf of FIG. 12. However, instead of utilizing a sealing element with a primary seal and a secondary seal with four tips from the two inside flanges and the two outside flanges, the present embodiment has a single tip for each of the primary seal and the secondary seal. Further, instead of pointing away from one another, the one tip from the primary seal and the one tip from the secondary seal point at one another. The outside sealing flange 222 of the secondary seal and the outside flange 122 of the primary seal are connected to one another by a seal bridge 223, which can be unitarily or singularly formed with the two outside flanges. Like the embodiment of FIGS. 12-14, the inside flange of the primary seal seals against the shaft and the inside flange of the secondary seal seals against the surface of the shelf. Material shrinkage can cause the inside flange 120 of the primary seal 214 to further press against the shaft and the inside flange 220 of the secondary seal 216 to further press against the surface of the shelf 204.

Figure 16:
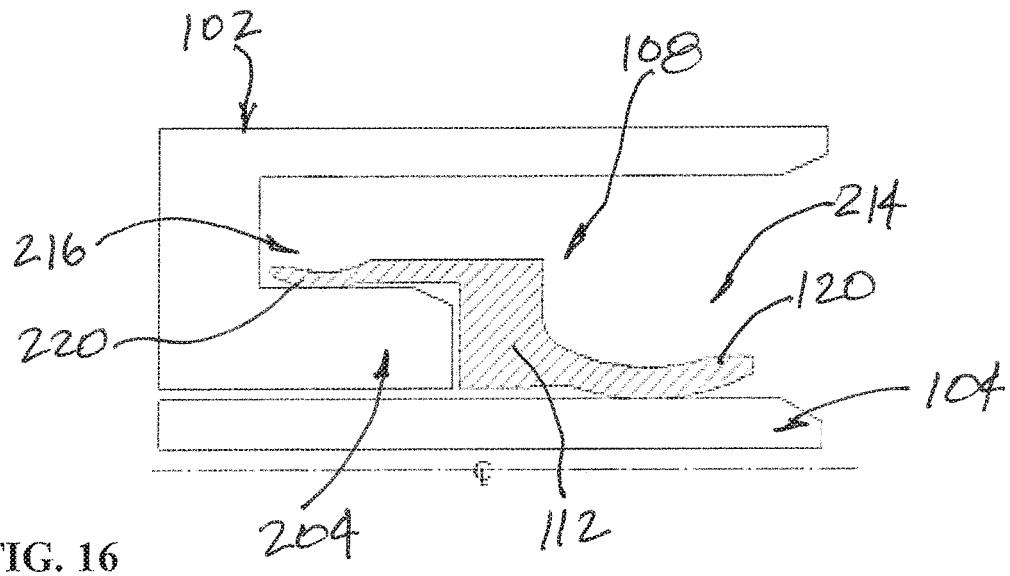
FIG. 16 shows a section of a sealing environment about an axis of a shaft showing a housing, a shaft, and a seal assembly.

With reference now to FIG. 16, a seal assembly 108 provided accordance with still further aspects of the present invention is shown in a sealing environment 100 comprising a gland or housing 102 and a shaft 104, similar to the seal assembly of FIGS. 12-15 and more particularly to the seal assemblies of FIGS. 12 and 15. In the present embodiment, the housing or gland 102 is provided with a shelf 204 that is similar to the shelf of FIGS. 12 and 15. However, instead of utilizing a sealing element in which the primary seal and the secondary seal both have outside flanges and loading springs, the seal element 112 of the present embodiment omits the loading springs and the outside flanges. Recognizing that in extremely low temperature applications the outside flanges will shrink and separate from the metal surfaces anyway, the present seal assembly omits the loading springs and the outside flanges.

As shown in FIG. 16, the inside flange 220 of the secondary seal 216 forms a bore for sealing against the shelf 204 and the inside flange 112 of the primary seal 214 forms a bore sealing against the shaft 104. The two inside flanges 112, 220 have tips that point away from one another. Thus, when the seal element 112 of the present embodiment shrinks due to low temperature conditions, the seal assembly improvise its sealing ability by more tightly fitting around the shelf at the secondary seal 216 and around the shaft at the primary seal 214. In particular, at low temperatures, the bore of the primary seal can shrink to more tightly seal against the shaft and the bore of the secondary seal can shrink to more tightly seal against the shelf.

Figure 17:
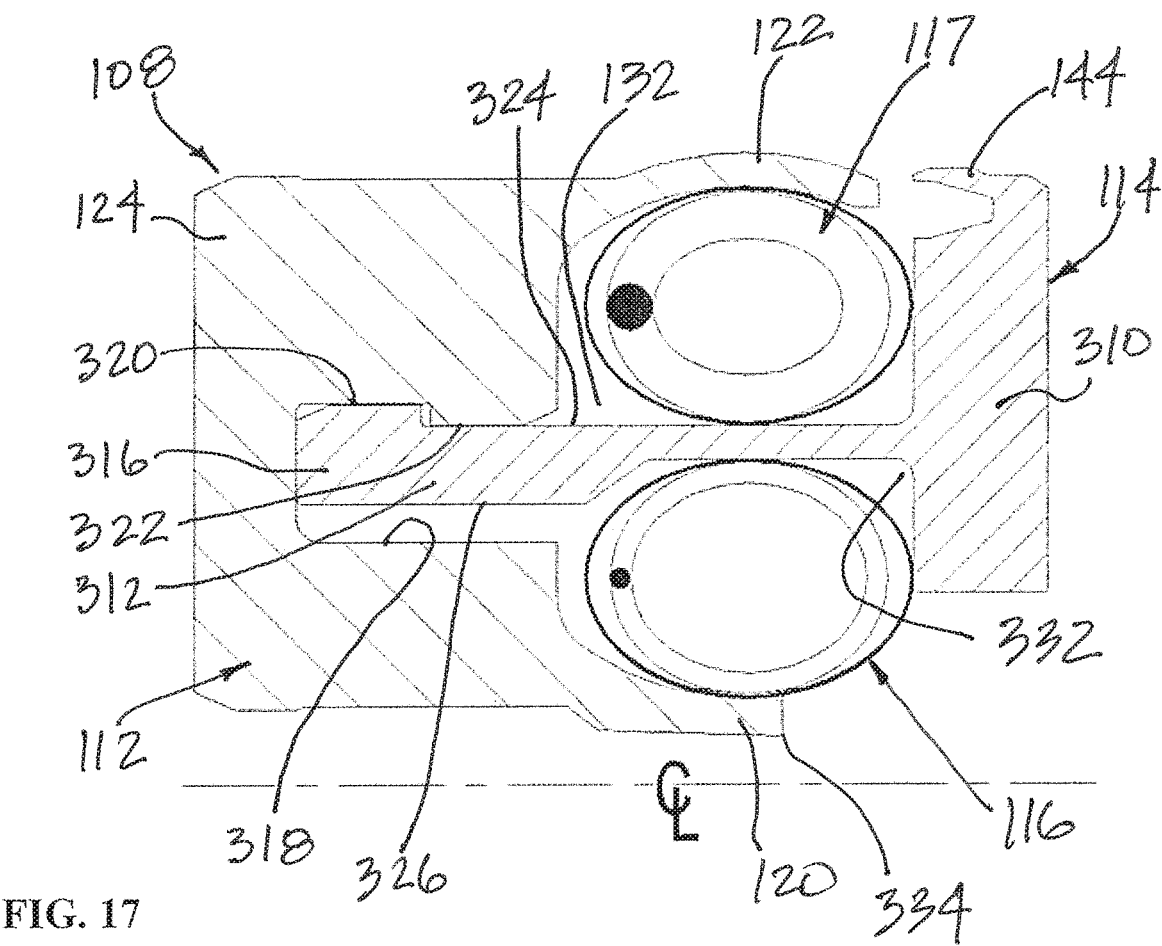
FIG. 17 shows a section of a sealing environment about an axis of a shaft showing a housing, a shaft, and a seal assembly.

With reference now to FIG. 17, a section of a seal assembly 108 provided accordance with still further aspects of the present invention is shown outside of a sealing environment. The seal assembly 108 of the present embodiment comprises a seal element 112 having seal body with an inside flange 120, an outside flange 122, and a center channel section 124, which together define a seal cavity 132. In the present embodiment, a locking ring 114 is used to secure the seal assembly 108 in a gland. The locking ring 114 comprises a leaf spring 144 formed by incorporating a notch into the body of the locking ring 114. The present seal assembly 108 is usable in a sealing environment, such as in a housing or gland for sealing against a surface, such as a shaft that can rotate or reciprocate.

The locking ring 114 has a first section 310 with the leaf spring 144 and a second section 312 extending from the first section 310. In some examples, a rounded or blunt contact edge may be used in an interference fit with the housing instead of the leaf spring, similar to that shown in FIG. 20. The second section 312 has a tip or end 316 that extends into a channel or annular channel 318 formed in the center channel section 124 of the seal body of the sealing element 112. The channel 318 in the center channel section 124 defines a receiving space. In an example, the end 316 of the second section 312 is provided with a lip or step 320 for mechanically engaging a lip or step 322 formed in the annular channel 318 of the center channel section 124. The engagement between the two lips or step 320, 322 ensure engagement of the locking ring 114 and the seal element 112. In low temperature applications wherein the seal element 112 can shrink, shrinkage of the seal element 112 especially at the annular channel 318 will result in the lip 322 of the annular channel 318 more positively engaging the lip 320 of the second section 312.

The second section 312 of the locking ring 114 bisects the seal cavity 132 into two compartments or smaller cavities for accommodating two loading springs 116, 117. The loading spring 116 used to bias the inside flange 120 and the loading spring 117 used to bias the outside flange 122 can be of the same type, of different types, of similar or different sizes. For example, one can be a canted coil spring and the other can be a ribbon spring or a combination spring as shown in FIG. 3. As shown, both loading springs 116, 117 can be a combination ribbon spring having a canted coil spring located inside the ribbon spring, as discussed with reference to FIG. 3. Both loading springs 116, 117 are biased against the second section 312 of the locking ring 114 and whereas the lower loading spring 116 biases against the inside flange 120, the upper loading spring 117 biases against the outside flange 122. The two loading springs 116, 117 in the same seal cavity 132 are configure to bias the inside flange and the outside flange away from one another. In the embodiment shown, the locking ring 114, and more particularly the second section 312 that bisects the seal cavity, is configured to support both loading springs 116, 117 to enable the loading springs to bias outwardly against the inside flange 120 and the outside flange 122, respectively.

In the embodiment shown, the upper surface 324 of the second section 312 of the locking ring 114 is generally flat or planar. A locating groove, similar to groove 184 of FIG. 8, may be incorporated with the upper surface or second surface 324 to position the loading spring 117. The lower surface or first surface 326 is provided with a groove 332, which has two sides and a bottom surface. The lower loading spring 116 is in contact with the bottom surface of the groove 332 but wherein the tapered sidewall of the groove 332 can be spaced from the lower loading spring or can contact the lower loading spring 116 to rotate or turn the lower loading spring 116 when in an assembled state.

As shown, the outside flange 122 is provided with a curved flange surface. The curved flange surface of the outside flange can resemble a section of the arc of the upper loading spring 117. The curved flange surface can decrease the contact strip or area of the outside flange to increase the sealing stress or force against a surface to seal against, such as a gland. For example, a flat surface can produce a line contact. However, a curved or rounded surface can produce a smaller or reduced area contact. Optionally or alternatively, a thinned out or reduced thickness section can be incorporated with the outside flange 122 by including a groove, similar to the groove 154 or groove 187 shown in FIGS. 2 and 6.

As shown, the inside flange 120 is provided with a generally flat sealing lip with a moderate chamfer 334 near the far end or the terminal end of the inside flange 120. The moderate chamfer 334 instead of a flat section can reduce the contact area of the seal lip with the shaft to thereby increase the sealing stress when loaded by the lower spring 116 against the shaft. Optionally or alternatively, a thinned out or reduced thickness section can be incorporated with the inside flange by including a groove, similar to that shown in FIGS. 2 and 6.

Figure 18:
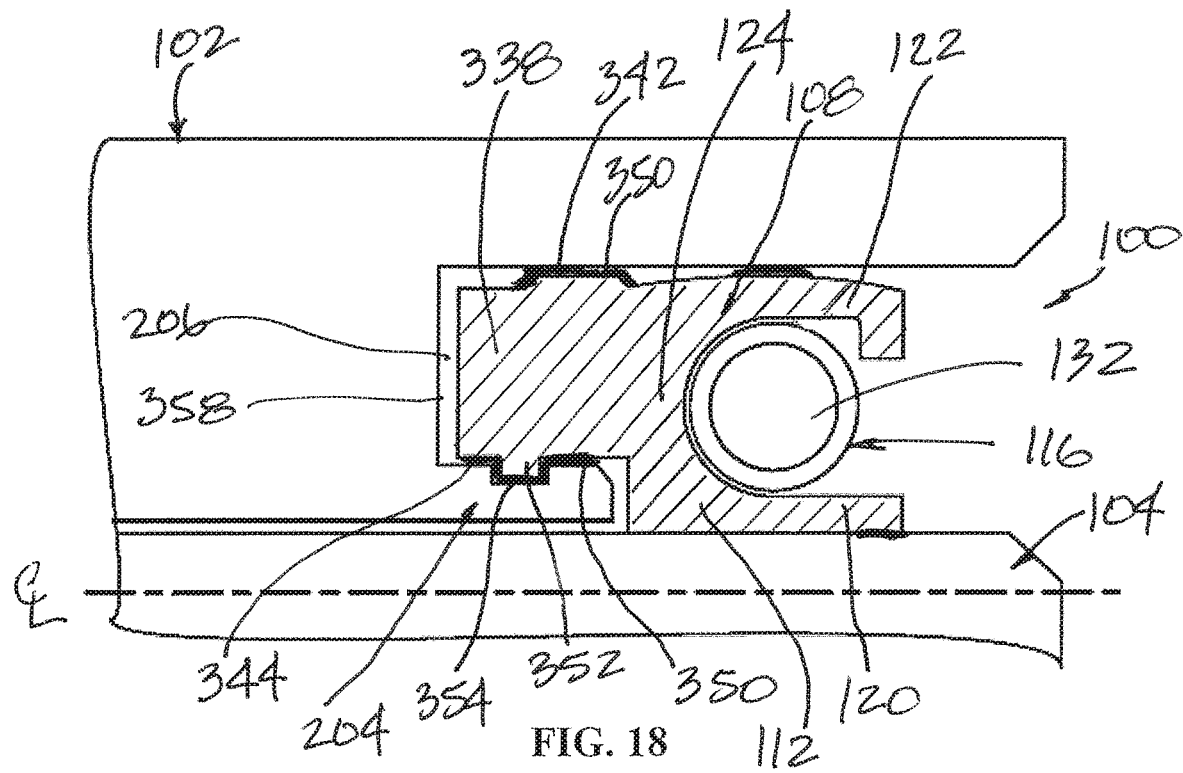
FIG. 18 shows a section of a sealing environment about an axis of a shaft showing a housing, a shaft, and a seal assembly.

With reference now to FIG. 18, a seal assembly 108 provided in accordance with further aspects of the present invention is shown. The seal assembly 108 of the present embodiment is shown located in a gland 102 for sealing against a shaft 104 or a stationary plate or flange. The present seal assembly 108 comprises a seal element 112, a loading spring 116, an optional locking ring, and optional support rings 192, 194, which can be made from metal bands similar to that described with reference to FIG. 10. Like other seal elements described elsewhere herein, the seal element 112 comprises an inside flange 120, an outside flange 122, and a center channel section 124 located between the two flanges, which together define a seal cavity 132. In the present embodiment, a center channel extension 338 is provided that lengthens the center channel section 124 of the seal element along an axial direction. The present seal element 112 with the center channel extension 338 is used with a housing 102 comprising a shelf 204, similar to that shown in FIG. 12 for use with a secondary seal. However, rather than incorporating a secondary seal with sealing lips with a loading spring like that of FIG. 12, the present center channel extension 338 utilizes projections or stubs to engage the shelf 204.

In an example, the center channel extension 338 comprises an outer surface 342 and an inner surface 344, as viewed relative to one another and relative to the shaft. The outer surface 342 is provided with an enlarged projection 350 and the inner surface 344 is provided with an enlarged projection 350 as well as a stub 352. The enlarged projection 350 can also be provided with the stub 352. The enlarged projections 350 on the inner and outer surfaces 342, 344 are provided to form an interference fit between the center channel extension 338 and the bore defining the reduced space 206. The stub 352 extends into the channel 354 formed on or in the shelf 204. The configuration shown is configured to minimize leak paths by sizing the inner surface 344 and the channel 354 at the shelf 204 so that that a seal is formed and a lock is provided during shrinkage of the seal element 112 at low operating temperatures.

The engagement between the stub 352 and the channel 354 can assist in eliminating axial dislocation of the seal due to cryogenic temperatures. It is believed that small amounts of media trapped behind the back wall 358 of the center channel extension 338 can expand to force the stub and channel and the enlarged projections to further press against the housing and the shaft to increase sealing stress at low temperatures. In an example, an enlarged projection can also be incorporated on the outer exterior surface of the outside flange 122 to create a region or section of high surface contact stress when that surface is biased outwardly by the loading spring 116 to seal against the housing.

The present seal assembly is suited for use in cryogenic reciprocating applications. Further a lock ring, such as those described elsewhere herein, can be included to secure the seal assembly and prevent unwanted rotation.

Figure 19:
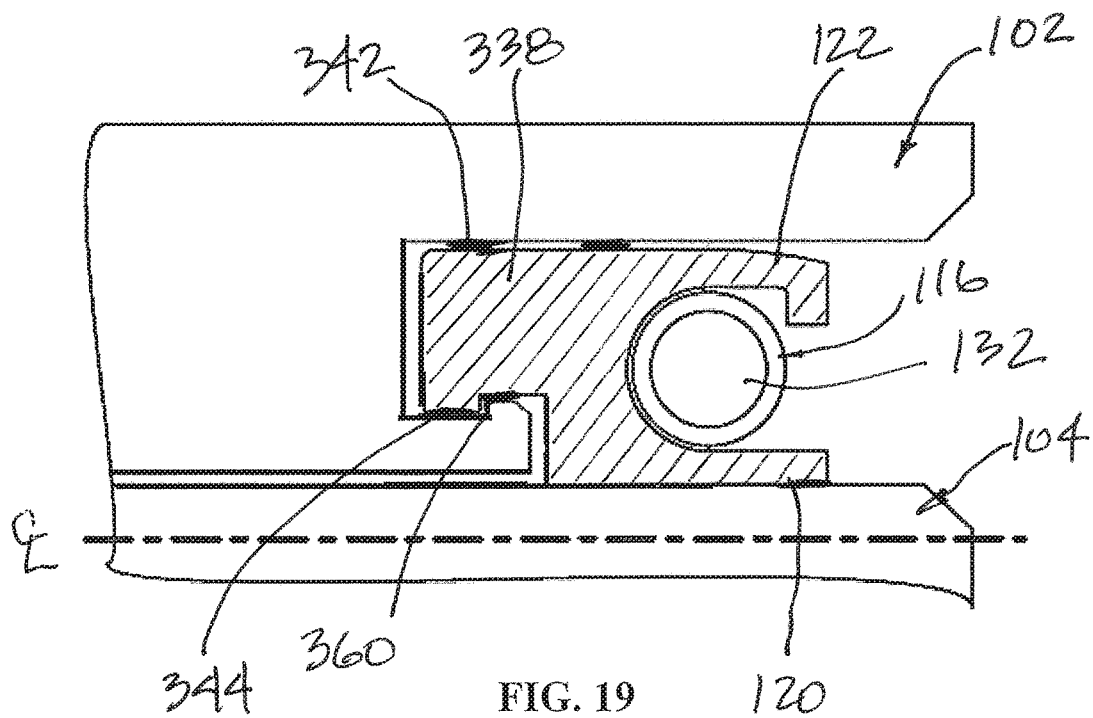
FIG. 19 shows a section of a sealing environment about an axis of a shaft showing a housing, a shaft, and a seal assembly.

With reference now to FIG. 19, a seal assembly 108 provided in accordance with further aspects of the present invention is shown. The seal assembly 108 of the present embodiment is similar to the seal assembly shown in FIG. 18 with a few exceptions. In the present embodiment, the engagement with the shelf 204 has been modified. Instead of a stub along an intermediate position on the center channel extension 338, the present embodiment utilizes a detent engagement 360 to mechanically engage the seal element 112 with the housing 102. The detent can include a step on the seal element engaging a step on the housing.

In an example, the center channel extension 338 of the present embodiment comprises an outer surface 342 and an inner surface 344, as viewed relative to one another and relative to the shaft. The outer surface 342 is provided with an enlarged projection 350 and the inner surface 344 is provided with an enlarged projection 350 as well as a stub 352. The enlarged projection 350 can also be provided with the stub 352. The enlarged projections 350 on the inner and outer surfaces 342, 344 are provided to form an interference fit between the center channel extension 338 and the bore defining the reduced space 206. The stub 352 extends into the channel 354 formed on or in the shelf 204. The configuration shown is configured to minimize leak paths by sizing the inner surface 344 and the channel 354 at the shelf 204 so that a seal is formed and a lock is provided during shrinkage of the seal element 112 at low operating temperatures.

The engagement between the stub 352 and the channel 354 can assist in eliminating axial dislocation of the seal due to cryogenic temperatures. It is believed that small amounts of media trapped behind the back wall 358 of the center channel extension 338 can expand to force the stub, the channel and the enlarged projections to further press against the housing and the shaft to increase sealing stress at low temperatures. In an example, an enlarged projection can also be incorporated on the outer exterior surface of the outside flange 122 to create a region or section of high surface contact stress when that surface is biased outwardly by the loading spring 116 to seal against the housing.

The present seal assembly is suited for use in cryogenic reciprocating applications. Further a lock ring, such as those described elsewhere herein, can be include to secure the seal assembly and prevent unwanted rotation.

Figure 20:
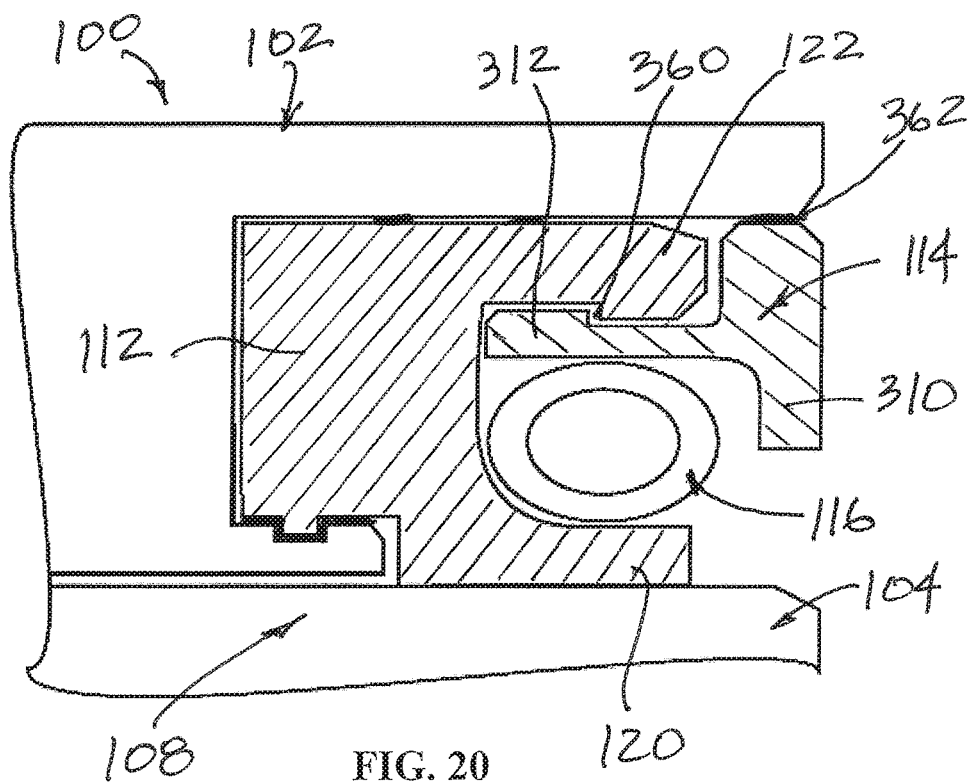
FIG. 20 shows a section of a sealing environment about an axis of a shaft showing a housing, a shaft, and a seal assembly.

With reference now to FIG. 20, a seal assembly 108 provided in accordance with further aspects of the present invention is shown. The seal assembly 108 of the present embodiment is similar to the seal assembly shown in FIG. 18 with a few exceptions. In the present embodiment, a locking ring 114 is included for use to secure the seal assembly 108 to the housing or gland 102 to prevent rotation of the seal assembly relative to the housing. The locking ring 114 is engaged to the seal element 112 using a detent, which can include a step on the seal element engaging a step on the locking ring.

The contact edge 362 at the radial most end of the first section 310 of the locking ring 114 includes a round or blunt end. This contact edge 362 is sized and shaped for an interference fit with the internal bore of the housing 102 to function as an anti-rotation device to secure the seal assembly from rotating relative to the housing. In other examples, a leaf spring can be incorporated at the contact edge 362, similar to the leaf spring shown in FIGS. 2 and 6. The present embodiment utilizes a detent engagement 360 to mechanically engage the seal element 112 with the housing 102.

Figure 21:
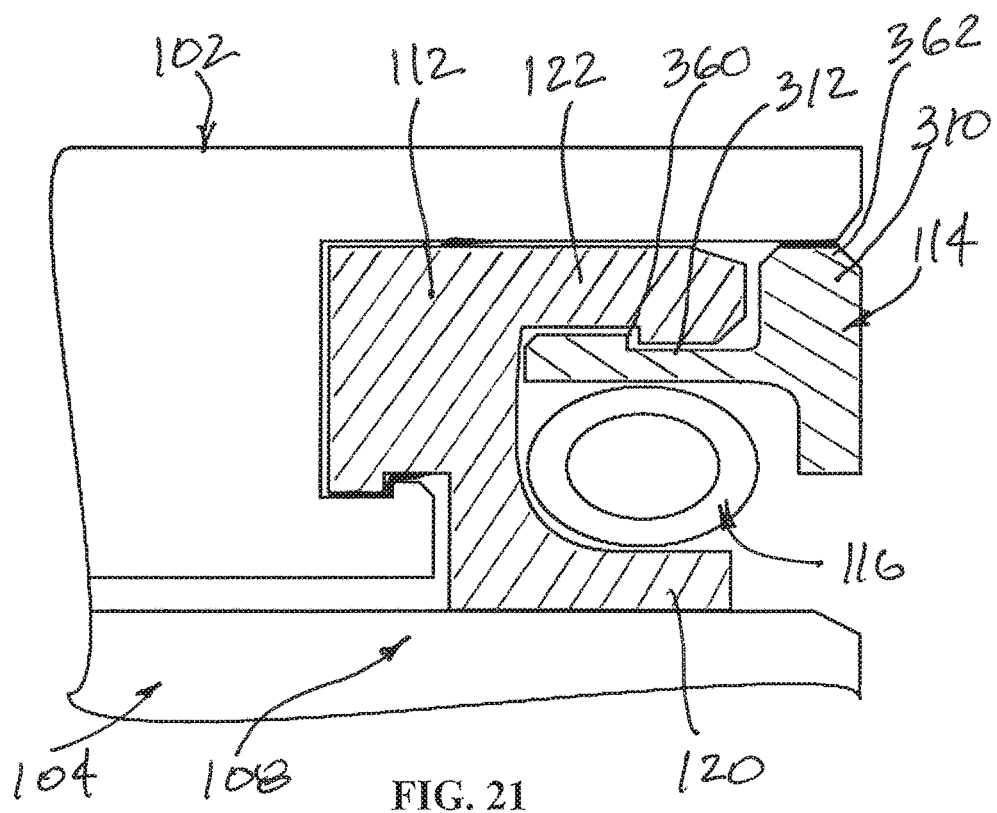
FIG. 21 shows a section of a sealing environment about an axis of a shaft showing a housing, a shaft, and a seal assembly.

With reference now to FIG. 21, a seal assembly 108 provided in accordance with further aspects of the present invention is shown. The seal assembly 108 of the present embodiment is similar to the seal assembly shown in FIG. 19 with a few exceptions. In the present embodiment, a locking ring 114 is included for use to secure the seal assembly 108 to the housing or gland 102 to prevent rotation of the seal assembly. The locking ring 114 is engaged to the seal element 112 using a detent 360, which can include a step on the seal element engaging a step on the locking ring.

The contact edge 362 at the radial most end of the first section 310 of the locking ring 114 includes a round or blunt end. This contact edge 362 is sized and shaped for an interference fit with the internal bore of the housing 102 to function as an anti-rotation device to secure the seal assembly from rotating relative to the housing. In other examples, a leaf spring can be incorporated at the contact edge 362, similar to the leaf spring shown in FIGS. 2 and 6. The present embodiment utilizes a stub 352 on the seal element to mechanically engage the channel 354 on the housing 102 to secure the two from axial separation.

FIG. 22 shows a conventional spring energized lip seal assembly 370 located in a housing 102 for sealing against a shaft 104. The seal assembly 370 comprises a seal element 372 and a spring energizer 374, which can be a canted coil spring, a ribbon spring, or a V-spring. When mounted in the sealing environment, the seal assembly 370 has two sealing contact points, one with the shaft at 380 and one with the housing at 382. The conventional seal assembly is prone to leakage when used in a low temperature application, such as in a cryogenic application. As previously discussed, in a cryogenic application, the seal element 372 will shrink and the outer seal point 382 is prone to leak.

FIG. 23 shows a seal assembly 108 provided in accordance with further aspects of the present invention is shown located in a gland 102 and sealing against a shaft 104. The seal assembly 108 of the present embodiment comprises a seal element 112 and a loading spring 116. The seal element 112 has a first sealing flange 120, a second sealing flange 122, and a center channel section 124 located therebetween, which together define a spring cavity 132. The loading spring 116 located in the spring cavity 132 can be a V-spring, a canted coil spring, a ribbon spring, or a combination spring, as shown in FIG. 3.

In the present embodiment, the shaft 104 has been modified to include a shoulder 384 having a shaft sealing surface 386. The seal element 112 has been rotated so that the center channel center section 124 is now generally parallel to the axis of the shaft 104 and the two sealing flanges 120, 122 are generally perpendicular to the axis of the shaft 104. As mounted, the seal assembly has two sealing contact points, one with the shoulder 384 of the shaft at sealing point 390 and one with the housing 102 at sealing point 392.

The present seal assembly is configured for use in low temperature applications, such as cryogenic applications. By turning the seal element as shown so that the sealing points are now at 390 and 392, even if the seal element shrinks, the shrinkage does not cause the sealing flanges 120, 122 to separate from the housing 102 and the shoulder 384 of the shaft. Instead, shrinkage will merely shifts the sealing points downward closer to the axis of the shaft. Thus, by rotating the orientation of the seal element and changing the locations of the sealing points, the present seal assembly is adapted to counteract possible seal element shrinkage in low temperature applications. The present seal assembly can be viewed as an axial seal, due to the rotation of the sealing element, for a radial application.

Refer now to FIG. 24, a conventional spring energized lip seal assembly 400 is shown positioned between a housing 102 and a shaft 104 and is shaft mounted. The seal assembly 400 comprises a seal element 372, a locking spring 376, and a spring energizer 374, which can be a canted coil spring, a ribbon spring, or a V-spring. When mounted in the sealing environment shown, the seal assembly 400 has two sealing contact points, one with the shaft at 380 and one with the housing at 382. The conventional seal assembly is prone to leakage when used in a low temperature application, such as in a cryogenic application. As previously discussed, in a cryogenic application, the seal element 372 will shrink and the outer seal point 382 is prone to leak.

Problems with the conventional seal of FIG. 24 can be solved using the seal assembly shown in FIG. 25, which is similar to the embodiment of FIG. 23. The present seal assembly 108 provided in accordance with further aspects of the present invention is shown located in a gland 102 and sealing against a shaft 104. The seal assembly 108 of the present embodiment comprises a seal element 112 and a loading spring 116. The seal element 112 has a first sealing flange 120, a second sealing flange 122, and a center channel section 124 located therebetween, which together define a spring cavity 132. The loading spring 116 located in the spring cavity 132 can be a V-spring, a canted coil spring, a ribbon spring, or a combination spring, as shown in FIG. 3.

In the present embodiment, the shaft 104 has been modified to include a shoulder 384 having a shaft sealing surface 386. The seal element 112 has been rotated so that the center channel center section 124 is now generally parallel to the axis of the shaft 104 and the two sealing flanges 120, 122 are generally perpendicular to the axis of the shaft 104. As mounted, the seal assembly has two sealing contact points, one with the shoulder 384 of the shaft at sealing point 390 and one with the housing 102 at sealing point 392.

The present seal assembly is configured for use in low temperature applications, such as cryogenic applications. By turning the seal element as shown so that the sealing points are now at 390 and 392, even if the seal element shrinks, the shrinkage does not cause the sealing flanges 120, 122 to separate from the housing 102 and the shoulder 384 of the shaft. Instead, shrinkage will merely shifts the sealing points downward closer to the axis of the shaft. Thus, by rotating the orientation of the seal element and changing the locations of the sealing points, the present seal assembly is adapted to counteract possible seal element shrinkage in low temperature applications. The present seal assembly can be viewed as an axial seal, due to the rotation of the sealing element, for a radial application.

Methods of making and of using the seal assemblies and components thereof are within the scope of the present invention.

Although limited embodiments of the seal assemblies and their components have been specifically described and illustrated herein, many modifications and variations will be apparent to those skilled in the art. For example, the various seal assemblies may be made from different but compatible materials as disclosed, different combination of loading springs may be used, different applications for the same disclosed seal assemblies, etc. Furthermore, it is understood and contemplated that features specifically discussed for one seal embodiment may be adopted for inclusion with another seal embodiment, provided the functions are compatible. For example, support rings and locating grooves may be used in another embodiment shown without the support rings and the locating grooves. Accordingly, it is to be understood that the seal assemblies and their components constructed according to principles of the disclosed device, system, and method may be embodied other than as specifically described herein. The disclosure is also defined in the following claims.

What is claimed is:

1. A method of using a spring energized lip seal at extreme temperatures comprising the steps:

placing a seal assembly in a housing to seal against a surface, wherein the seal assembly comprises:
  a seal element comprising an inside flange having a sealing lip defining a bore configured to receive a shaft and sealing against the shaft, an outside flange defining an outside diameter for sealing against a surface, and a center channel section; the inside flange, the outside flange, and the center channel section together define a seal cavity; said center channel section comprising a channel defining a receiving space;
  a locking ring comprising a first section and a second section extending from the first section, said second section having a tip extending into the receiving space of the channel of the center channel section;
  a first loading spring biasing against a first surface of the second section and against the inside flange;
  a second loading spring biasing against a second surface of the second section and against the outside flange;
securing the seal assembly against rotation relative to the housing or the surface; and
wherein the first section of the locking ring comprises a leaf spring or a contact edge, and wherein the method comprises engaging the leaf spring with the housing or engaging the contact edge with the housing.

2. The method of claim 1, further comprising biasing the inside flange and the outside flange away from one another.

3. The method of claim 1, further comprising engaging a step on the second section with a step located in the receiving space of the channel.

4. The method of claim 1, wherein the first surface comprises a groove and wherein the first loading spring is positioned in the groove.

5. The method claim 1, wherein the first loading spring is a combination spring comprising a ribbon spring comprising a plurality of coils and a canted coil spring located within the plurality of coils of the ribbon spring.

6. The method of claim 1, wherein the inside flange or the outside flange comprises a groove and wherein the first loading spring or the second loading spring contacts the groove.

7. The method of claim 1, further comprising placing a first support ring in contact with an inner interior surface of the inside flange and placing a second support ring in contact with an outer interior surface of the outside flange.

8. A spring assembly for extreme temperature applications comprising:
  a seal element comprising an inside flange, an outside flange, and a center channel section, which together define a seal cavity;
  a locking ring engaging the outside flange; said locking ring comprising a body comprising a groove;
  a first loading spring biasing against the locking ring and the inside flange;
  a second loading spring located in the groove of the locking ring and biasing against a bottom surface of the groove of the locking ring and an outer interior surface of the outside flange.

9. The spring assembly of claim 8, wherein the locking ring comprises a leaf spring or a contact edge for engaging a housing.

10. The spring assembly of claim 8, wherein the locking ring has a radial lip extending from a body section to reduce entry to the seal cavity.

11. The spring assembly of claim 8, wherein the bottom surface of the groove comprises a locating groove.

12. The spring assembly of claim 8, further comprising a center channel extension formed with the seal element projecting into a reduced spaced defined by a shelf of a housing.

13. The spring assembly of claim 8, further comprising a first support ring in contact with an inner interior surface of the inside flange.

* * * * *